United States Patent
Miyashita

(10) Patent No.: US 10,846,027 B2
(45) Date of Patent: Nov. 24, 2020

(54) PRINTING SYSTEM AND PRINTING APPARATUS

(71) Applicant: BROTHER KOGYO KABUSHIKI KAISHA, Nagoya (JP)

(72) Inventor: Tomoki Miyashita, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/575,346

(22) Filed: Sep. 18, 2019

(65) Prior Publication Data

US 2020/0104079 A1 Apr. 2, 2020

(30) Foreign Application Priority Data

Sep. 28, 2018 (JP) ................................. 2018-184089

(51) Int. Cl.
*G06F 3/12* (2006.01)

(52) U.S. Cl.
CPC .......... *G06F 3/1205* (2013.01); *G06F 3/1238* (2013.01); *G06F 3/1239* (2013.01); *G06F 3/1292* (2013.01)

(58) Field of Classification Search
CPC .... G06F 3/1205; G06F 3/1238; G06F 3/1239; G06F 3/1292; G06F 3/1291; G06Q 10/087
See application file for complete search history.

(56) References Cited

U.S. PATENT DOCUMENTS

| | | | |
|---|---|---|---|
| 2009/0166415 A1* | 7/2009 | Braun | G06Q 10/087 235/385 |
| 2013/0057918 A1* | 3/2013 | Ohta | G03G 21/02 358/1.15 |
| 2016/0210091 A1* | 7/2016 | Martin | G06F 3/1288 |
| 2017/0242642 A1* | 8/2017 | Barribeau | G06F 3/126 |
| 2017/0322691 A1* | 11/2017 | Tokuchi | H04N 1/00307 |
| 2018/0088880 A1* | 3/2018 | Tanaka | G06F 3/1204 |

FOREIGN PATENT DOCUMENTS

JP 2015-007857 A 1/2015

* cited by examiner

Primary Examiner — Iriana Cruz
(74) Attorney, Agent, or Firm — Kenealy Vaidya LLP

(57) ABSTRACT

A printing system includes a first printing apparatus and a second printing apparatus. A first controller of the first printing apparatus is configured to: accept designation of first-user-identification information; transmit first numeric information to the second printing apparatus; update the first printable number based on the first numeric information; and control a first conveyor and a first printing device to perform printing so as to limit the number of printed materials to be produced, to the first printable number. A second controller of the second printing apparatus is configured to: receive the first numeric information from the first printing apparatus; update second numeric information indicating a second printable number, based on the received first numeric information; and control the second conveyor and the second printing device to perform printing so as to limit the number of printed materials to be produced, to the second printable number.

24 Claims, 15 Drawing Sheets

One Second Elapsed

Two Seconds Elapsed

Three Seconds Elapsed

First Collection (into 1B)

Second Collection (into 1A)

Third Collection (Equal Division)

PRINTING SYSTEM AND PRINTING APPARATUS

CROSS REFERENCE TO RELATED APPLICATION

The present application claims priority from Japanese Patent Application No. 2018-184089, which was filed on Sep. 28, 2018, the disclosure of which is herein incorporated by reference in its entirety.

BACKGROUND

The following disclosure relates to a printing system and a printing apparatus configured to perform printing on a printing medium.

There is known a printing apparatus configured to perform printing on a printing medium and allow printing for a user when information is obtained over short-range wireless communication. In this conventional technique, when the user holds a mobile terminal over the printing apparatus, the short-range wireless communication is established, and setting information is transmitted from the mobile terminal to the printing apparatus to create a printed material.

SUMMARY

To enhance the conventional technique in which printing is performed only when information is obtained over the short-range wireless communication, it has been considered that a maximum number of printed materials allowed to be created is determined for each user in advance from the viewpoint of improved security, for example. In this case, for example, the printable number is stored in the printing apparatus for each user, and the user can create up to the printable number of printed materials.

In the case where the user creates the printed materials with limitation of the printable number assigned to the user, it is convenient if the printed materials can be created not only by one printing apparatus but also another or other printing apparatuses with compliance with the limitation. The above-described conventional technique does not consider this feature.

Accordingly, an aspect of the disclosure relates to a printing system and a printing apparatus configured to allow another printing apparatus to create printed materials using a printable number assigned to a user.

In one aspect of the disclosure, a printing system includes: a first printing apparatus; and a second printing apparatus. The first printing apparatus includes: a first conveyor configured to convey a first printing medium; a first printing device configured to perform printing on the first printing medium conveyed by the first conveyor; a first storage configured to store (i) user-identification information including at least first-user-identification information corresponding to a first user and (ii) numeric information indicating a printable number including at least a first printable number associated with the first-user-identification information; a first communication device configured to perform communication using a first wireless communication method; and a first controller. The second printing apparatus includes: a second conveyor configured to convey a second printing medium; a second printing device configured to perform printing on the second printing medium conveyed by the second conveyor; a second storage configured to store (i) user-identification information including at least the first-user-identification information and (ii) numeric information indicating a printable number including at least a second printable number associated with the first-user-identification information; a second communication device configured to perform communication using the first wireless communication method; and a second controller. The first controller of the first printing apparatus is configured to execute: a designation accepting processing in which the first controller accepts designation of the first-user-identification information via the first communication device; a first number allocating processing in which the first controller transmits first numeric information to the second printing apparatus in a state in which communication using the first wireless communication method is established between the first communication device of the first printing apparatus and the second communication device of the second printing apparatus by bringing one of the first printing apparatus and the second printing apparatus close to the other of the first printing apparatus and the second printing apparatus, and the first controller updates the first printable number based on the first numeric information, the first numeric information indicating at least a portion of the first printable number stored in the first storage and associated with the first user-identification information, of which designation is accepted in the designation accepting processing; and a first printing limiting processing in which the first controller controls the first conveyor and the first printing device to perform printing on the first printing medium based on print data so as to limit the number of printed materials to be produced, to the first printable number. The second controller of the second printing apparatus is configured to execute: a second number allocating processing in which the second controller receives the first numeric information from the first printing apparatus and updates second numeric information based on the received first numeric information, the second numeric information indicating the second printable number stored in the second storage and associated with the first user-identification information; and a second printing limiting processing in which the second controller controls the second conveyor and the second printing device to perform printing on the second printing medium based on print data so as to limit the number of printed materials to be produced, to the second printable number.

Another aspect of the disclosure relates to a printing apparatus. A first printing apparatus as the printing apparatus includes: a conveyor configured to convey a printing medium; a printing device configured to perform printing on the printing medium conveyed by the conveyor; a first storage configured to store (i) user-identification information including at least first-user-identification information corresponding to a first user and (ii) numeric information indicating a printable number including at least a first printable number associated with the first-user-identification information; a first communication device configured to perform communication using a first wireless communication method; and a first controller. The first controller is configured to execute: a designation accepting processing in which the first controller accepts designation of the first-user-identification information via the first communication device; a number allocating processing in which the first controller transmits first numeric information to a second printing apparatus different from the first printing apparatus in a state in which communication using the first wireless communication method is established between the first communication device of the first printing apparatus and a second communication device of the second printing apparatus by bringing one of the first printing apparatus and the second printing apparatus close to the other of the first printing apparatus and the second printing apparatus, and the first controller updates the first printable number based on the first numeric information, the first numeric information indicating at least a portion of the first printable number associated with the first user-identification information, of which designation is accepted in the designation accepting processing; and a printing limiting processing in which the first controller controls the conveyor and the printing device to perform printing on the printing medium based on print data so as to limit the number of printed materials to be produced, to the first printable number.

Yet another aspect of the disclosure relates to a printing apparatus. A second printing apparatus as the printing apparatus includes: a conveyor configured to convey a printing medium; a printing device configured to perform printing on the printing medium conveyed by the conveyor; a storage configured to store (i) user-identification information including at least first-user-identification information corresponding to a first user and (ii) numeric information indicating a printable number including at least a second printable number associated with the first-user-identification information; a second communication device configured to perform communication using a first wireless communication method; and a controller. The controller is configured to execute: a number receiving processing in which the controller receives first numeric information from a first printing apparatus different from the second printing apparatus in a state in which communication using the first wireless communication method is established between the second communication device of the second printing apparatus and a first communication device of the first printing apparatus by bringing one of the first printing apparatus and the second printing apparatus close to the other of the first printing apparatus and the second printing apparatus, and the controller updates, based on the first numeric information, second numeric information indicating the second printable number stored in the storage and associated with the first user-identification information, the first numeric information indicating at least a portion of the first printable number associated with the first user-identification information; and a printing limiting processing in which the controller controls the conveyor and the printing device to perform printing on the printing medium based on print data so as to limit the number of printed materials to be produced, to the second printable number.

Yet another aspect of the disclosure relates to a printing apparatus. A first printing apparatus as the printing apparatus includes: a conveyor configured to convey a printing medium; a printing device configured to perform printing on the printing medium conveyed by the conveyor; a first storage configured to store (i) user-identification information including at least first-user-identification information corresponding to a first user and (ii) numeric information indicating a printable number including at least a first printable number associated with the first-user-identification information; a first communication device configured to perform communication using a first wireless communication method; and a first controller. The first controller is configured to execute: a designation accepting processing in which the first controller accepts designation of the first-user-identification information via the first communication device; a number allocating processing in which the first controller receives first numeric information from a second printing apparatus different from the first printing apparatus in a state in which communication using the first wireless communication method is established between the first communication device of the first printing apparatus and a second communication device of the second printing apparatus by bringing one of the first printing apparatus and the second printing apparatus close to the other of the first printing apparatus and the second printing apparatus, and the first controller updates numeric information indicating the first printable number stored in the first storage based on the received first numeric information, the first numeric information indicating at least a portion of a second printable number stored in a second storage of the second printing apparatus and associated with the first user-identification information, of which designation is accepted in the designation accepting processing; and a printing limiting processing in which the first controller controls the conveyor and the printing device to perform printing on the printing medium based on print data so as to limit the number of printed materials to be produced, to the first printable number.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

EMBODIMENT

Hereinafter, there will be described one embodiment by reference to the drawings.

System Configuration

Figure 1:
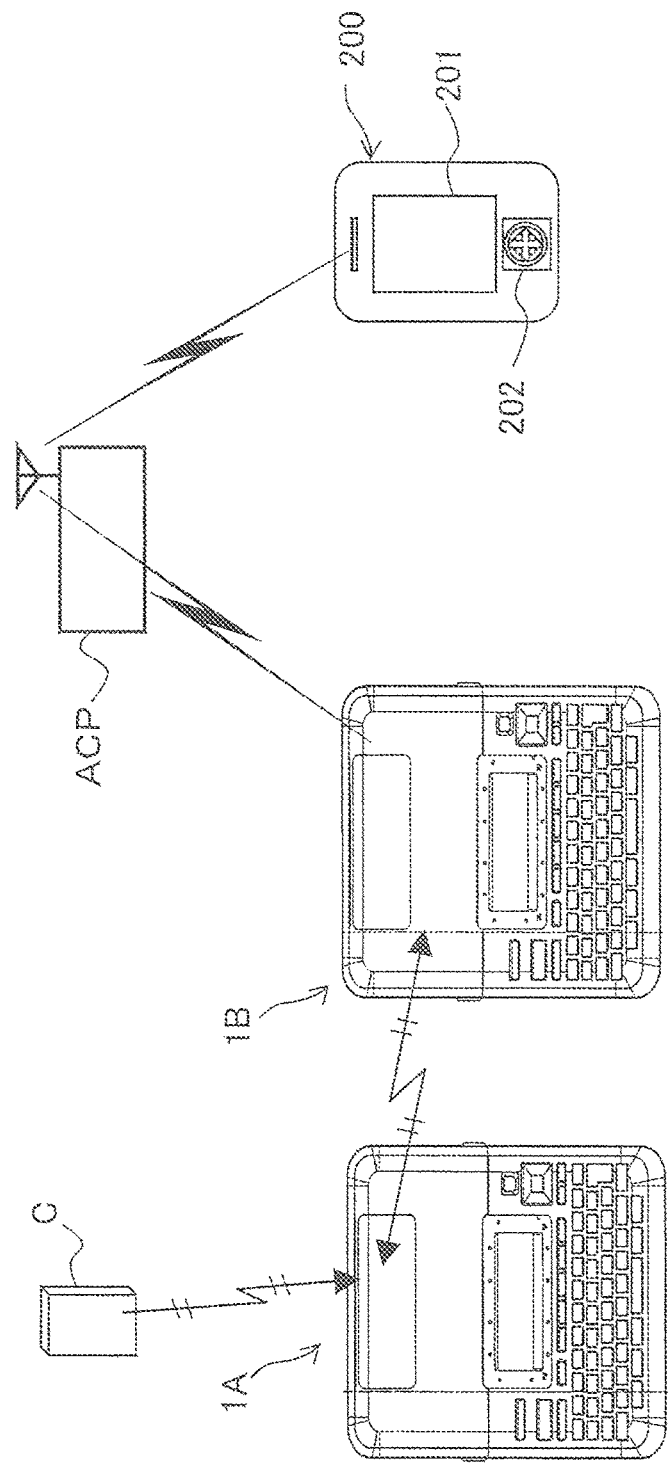
FIG. 1 is a schematic view of a printer according to one embodiment, another printer, an operation terminal, and a tag card.

FIG. 1 illustrates a printer 1A according to the present embodiment (as one example of a first printing apparatus), a printer 1B (as one example of a second printing apparatus), an operation terminal 200 for operating the printers 1A, 1B, and a tag card C configured to transfer information to and from the printer 1A over short-range communication, which will be described later in detail, when the tag card C is brought close to the printer 1A. In FIG. 1, each of the printer 1A, the printer 1B, and the operation terminal 200 is connected to an access point ACP (a base station), located at an indoor or outdoor placement, so as to enable transfer of information over mutual-recognition wireless communication such as Wi-Fi (registered trademark) or other wireless LANs, for example. It is noted that the method of the communication may be other wireless communication, such as Bluetooth (registered trademark) or wired communication using a USB cable.

The operation terminal 200 is an information terminal such as a personal digital assistant (PDA) as a mobile information terminal having a function corresponding to the mutual-recognition wireless communication, or a smartphone (e.g., a mobile phone having a PDA function), for example. This operation terminal 200 includes a touch screen 201 and operation buttons 202, for example. The touch screen 201 has a display function for displaying various kinds of information and messages on a liquid crystal display. The touch screen 201 is capable of accepting instructions and information input by an operator with the operation buttons 202. Thus, a portion of the touch screen 201 which has the display function will be hereinafter referred to as "display 201", and an operable portion of the touch screen 201 and the operation buttons 202 will be hereinafter referred to as "operation interface 202". The operation terminal 200 transmits print data to the printers 1A, 1B over the mutual-recognition wireless communication via the access point ACP to cause the printers 1A, 1B to perform printing. The printers 1A, 1B have the same configuration and thus may be hereinafter collectively referred to as "printer 1".

Configuration of Printer

Figure 2:
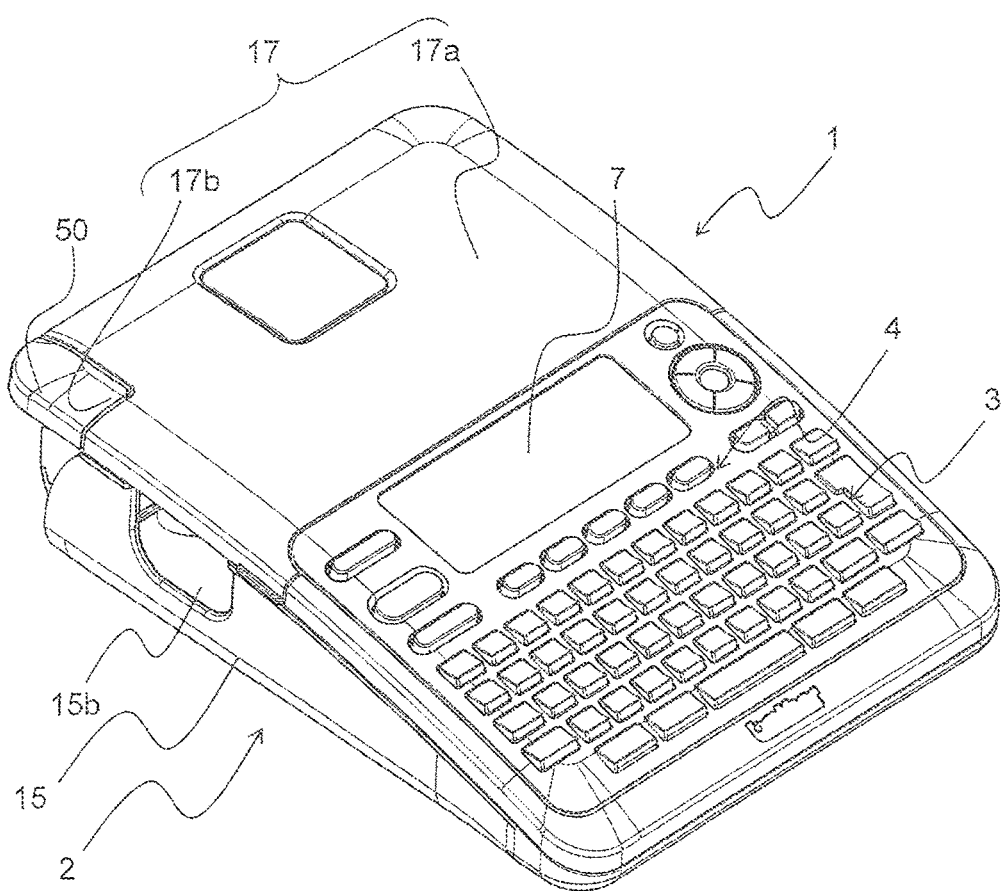
FIG. 2 is a perspective view of the printer.
Figure 3:
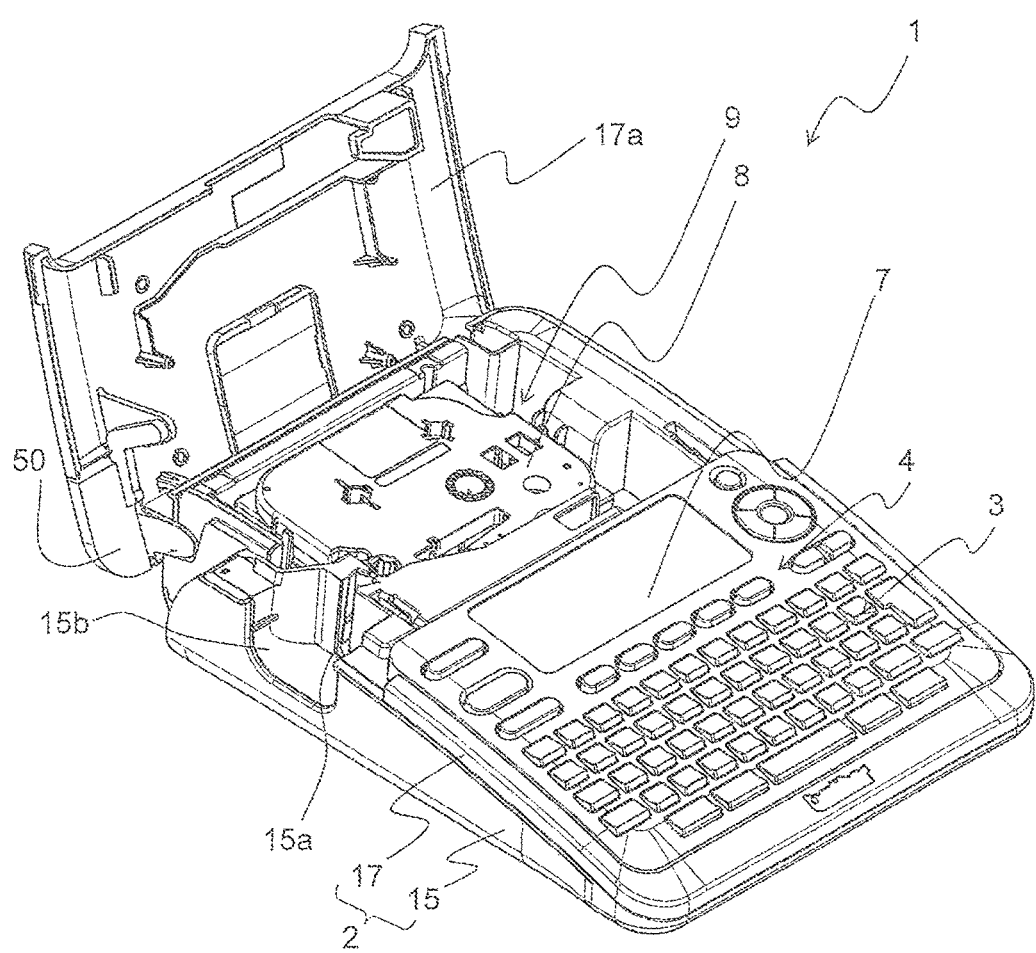
FIG. 3 is a perspective view of the printer, with a cartridge cover being open.

There will be next described a configuration of the printer 1 with reference to FIGS. 2 and 3.

As illustrated in FIGS. 2 and 3, the printer 1 includes a housing 2 forming an external appearance. The housing 2 includes a lower cover 15 formed of resin and constituting a lower and side surfaces of the printer 1; and an upper cover 17 formed of resin and constituting an upper surface of the printer 1.

One of the side surfaces of the lower cover 15 has a recess 15b and an output opening 15a formed at the center of a rear portion of the recess 15b. A printed-label tape 109 (see FIG. 4), which will be described below, is to be discharged through the output opening 15a.

The upper cover 17 is provided with a keyboard 3, a function-key group 4, and a display 7. The keyboard 3 is an input interface enabling a user to input characters, for example. The function-key group 4 includes function keys and buttons for achieving various functions of the printer 1, such as a print button and a power button. The display 7 is installed so as to close a rectangular opening, for example.

A cartridge holder 9 is provided at a rear portion of the upper surface of the printer 1. A cartridge 8 is mountable in and removable from the cartridge holder 9. The upper cover 17 includes a cartridge cover 17a for mounting the cartridge 8 shaped like a tape cassette. The cartridge holder 9 is normally closed by the cartridge cover 17a (see FIG. 2). When the cartridge cover 17a is opened, the cartridge holder 9 is exposed (see FIG. 3). A cutout 17b is formed in an end portion of the cartridge cover 17a. The cutout 17b accommodates a cut lever 50 that is an operating lever for cutting the printed-label tape 109.

Figure 4:
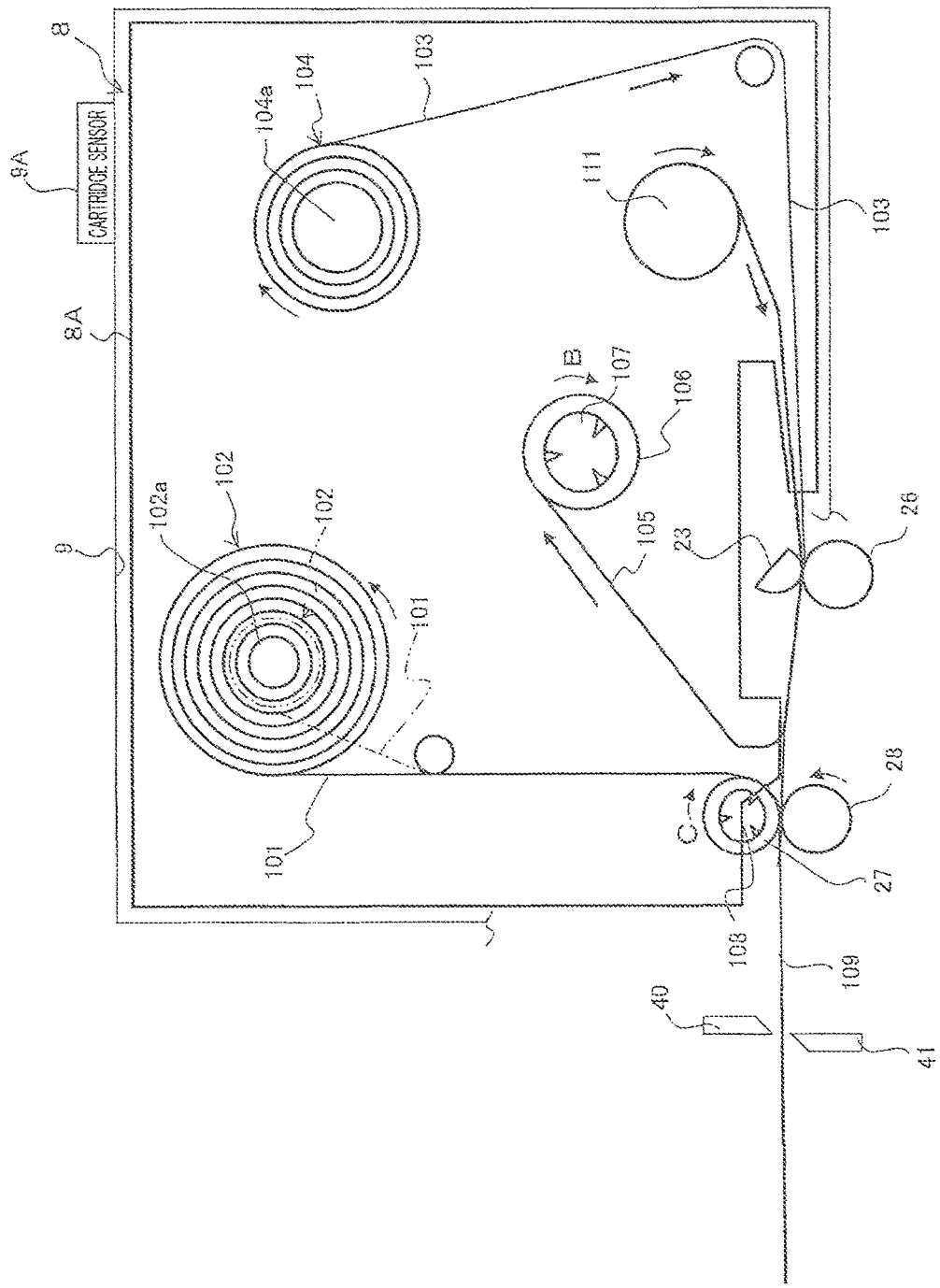
FIG. 4 is a plan view conceptually illustrating an internal structure of a cartridge.

There will be next described the cartridge 8 and the cartridge holder 9 in detail with reference to FIG. 4. The cartridge 8 includes: a housing 8A; a first roll 102 disposed in the housing 8A which is a roll of a strip-shaped substrate tape 101 and has a spiral shape (noted that FIG. 4 illustrates the first roll 102 in the form of concentric circles for simplicity); a second roll 104 which is a roll of a transparent printing tape 103 having substantially the same width as that of the substrate tape 101 and has a spiral shape (noted that FIG. 4 illustrates the second roll 104 in the form of concentric circles for simplicity); a ribbon-supply-side roll 111 that feeds an ink ribbon 105 (noted that ribbon-supply-side roll 111 is not necessary in the case where the printing tape 103 is of a thermal tape); a ribbon-take-up roller 106 that takes up the ink ribbon 105 after printing; and a tape conveying roller 27 rotatably supported near a tape output portion of the cartridge 8. It is noted that the printing tape 103 is one example of a printing medium.

The substrate tape 101 of the first roll 102 is wound around a reel member 102a. The substrate tape 101 is constituted by an adhesive layer, a base film, an adhesive layer, and a release paper sheet stacked on one another in this order in a direction directed from an inner side toward an outer side of the first roll 102, for example. The printing tape 103 of the second roll 104 is wound around a reel member 104a.

The tape conveying roller 27 presses and sticks the substrate tape 101 and the printing tape 103 against and to each other to form the printed-label tape 109 while conveying the printed-label tape 109.

A fixed blade 40 and a movable blade 41 are provided downstream of the tape conveying roller 27 and a pressing-contact roller 28 (i.e., downstream of a print head 23 which will be described below) along a path through which the printed-label tape 109 is conveyed. The movable blade 41 is moved forward toward the fixed blade 40 by a manual operation of the cut lever 50 and cooperates with the fixed blade 40 to cut the printed-label tape 109 in its thickness direction.

A ribbon-take-up-roller drive shaft 107 and a tape-conveying-roller drive shaft 108 are provided on the cartridge holder 9. The ribbon-take-up-roller drive shaft 107 takes up the used ink ribbon 105 in the cartridge 8. The tape-conveying-roller drive shaft 108 conveys the printed-label tape 109. The tape-conveying-roller drive shaft 108 is one example of a conveyor. When a driving force generated by a motor, not illustrated, for the conveying roller is transmitted to the ribbon-take-up-roller drive shaft 107 and the tape-conveying-roller drive shaft 108, the ribbon-take-up roller 106 and the tape conveying roller 27 are rotated in conjunction with each other. The print head 23 is provided on the cartridge holder 9 so as to be positioned at an opening of the cartridge 8 when the cartridge 8 is mounted. The print head 23 performs printing on the printing tape 103 being conveyed. This print head 23 is one example of the printing device. The print head 23 is spaced apart from the movable blade 41 and the fixed blade 40 at a predetermined distance along the tape conveying path. The cartridge holder 9 is provided with a cartridge sensor 9A configured to detect the type of the cartridge 8 mounted on the cartridge holder 9 in a well-known manner. Specifically, the type of the cartridge 8 indicates the type of the printing tape 103 such as its width and other properties.

Operations for Creating Printed Tape

When the cartridge 8 is mounted on the cartridge holder 9, the printing tape 103 and the ink ribbon 105 are nipped between the print head 23 and a platen roller 26 opposed to the print head 23. The substrate tape 101 and the printing tape 103 are nipped between the tape conveying roller 27 and the pressing-contact roller 28 opposed to the tape conveying roller 27. The ribbon-take-up roller 106 and the tape conveying roller 27 are rotated in synchronization with each other respectively in directions indicated by arrows B and C in FIG. 4. This rotates the tape conveying roller 27, the pressing-contact roller 28, and the platen roller 26 to cause the substrate tape 101 to be drawn from the first roll 102 and supplied to the tape conveying roller 27. The printing tape 103 is drawn from the second roll 104, and a multiplicity of heating elements of the print head 23 are energized by a printing-drive circuit, not illustrated. As a result, printing is performed on a back surface of the printing tape 103.

The substrate tape 101 and the printing tape 103 having been printed are bonded to each other by the tape conveying roller 27 and the pressing-contact roller 28 and formed together as the printed-label tape 109 that is discharged to the outside of the cartridge 8 through the tape output portion.

After printing is performed on the printing tape 103, the ink ribbon 105 is taken up by the ribbon-take-up roller 106 rotated by the ribbon-take-up-roller drive shaft 107.

The printed-label tape 109 discharged to the outside of the cartridge 8 as described above is cut by the fixed blade 40 and the movable blade 41 operated by a manual operation of the cut lever 50, to create a printed label, not illustrated, as a printed material. In this cutting, as described above, the manual operation of the cut lever 50 by the user is transferred to the movable blade 41 via a mechanism, not illustrated, to move the movable blade 41 forward toward the fixed blade 40 to close the movable blade 41 and the fixed blade 40 like scissors.

Functional Configurations of Printer, Tag Card, and Operation Terminal

Figure 5:
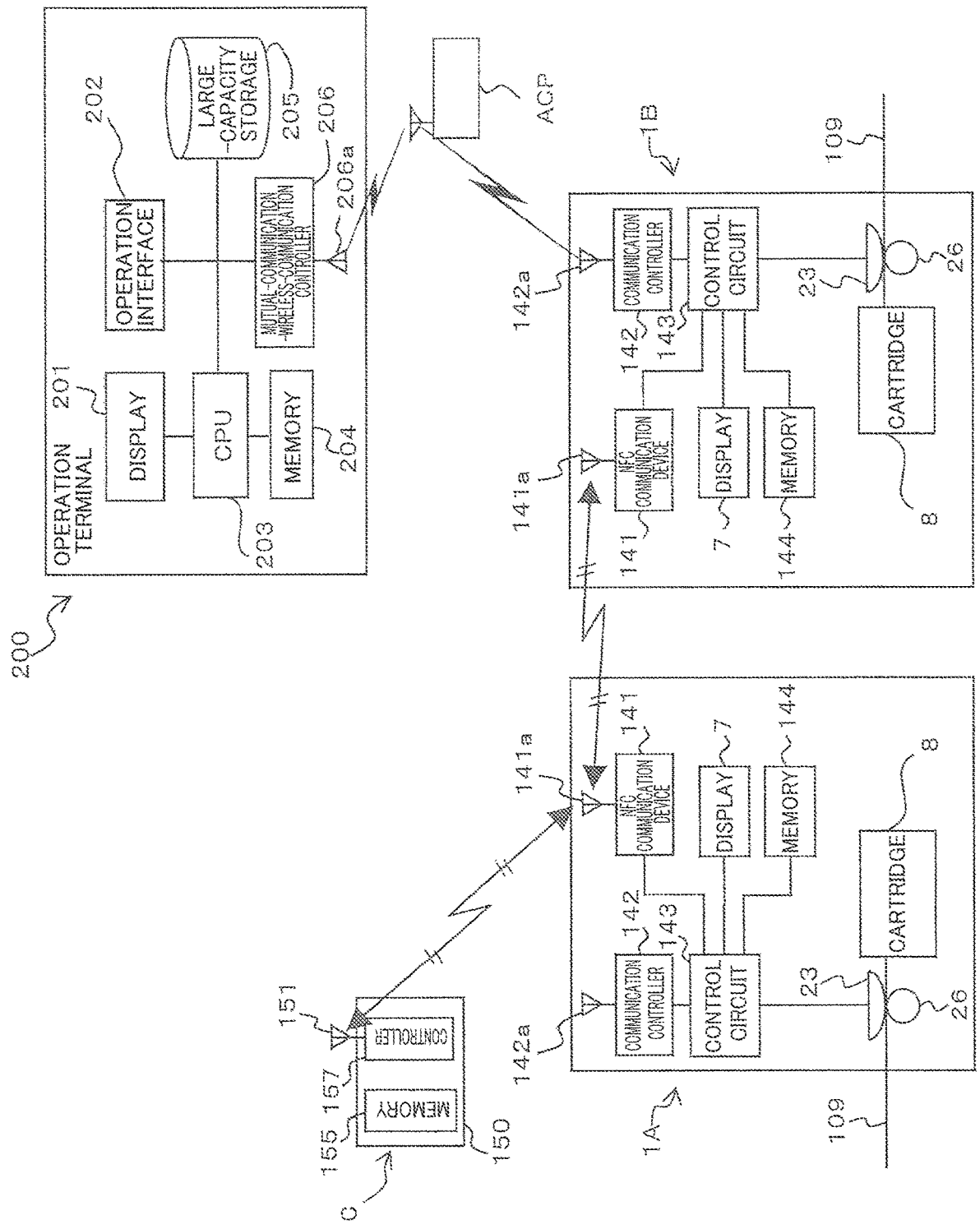
FIG. 5 is a block diagram illustrating functional configurations of printers, a tag card, and an operation terminal.

There will be next described functional configurations of the printers 1, the tag card C, and the operation terminal 200 with reference to FIG. 5.

Functional Configuration of Printer

As illustrated in FIG. 5, each of the printers 1A, 1B includes: the print head 23 configured to perform printing on the printing tape 103; the platen roller 26; a control circuit 143; a memory 144 such as a random-access memory (RAM) or a read-only memory (ROM); the display 7; a communication device 141 for near-field communication (NFC); a first antenna 141a; a communication controller 142; and a second antenna 142a. The control circuit 143 is one example of a controller. The memory 144 is one example of a first storage.

The communication device 141 for NFC (hereinafter referred to as "NFC communication device 141") controls communication according to the NFC standards between the printers 1A, 1B via the first antennas 141a and between the tag card C and each of the printers 1A, 1B via the first antenna 141a. NFC is a set of communication protocols that enable short-range wireless communication requiring a separation of a relatively short range of about 10 cm or less. Communication according to the NFC standards may be hereinafter referred to as "NFC communication". The NFC communication is one example of first wireless communication, and the NFC communication device 141 is one example of a first communication device.

The communication controller 142 controls mutual-recognition wireless communication which is performed between the printer 1 and the access point ACP via the second antenna 142a. The mutual-recognition wireless communication requires a separation of a relatively long range that is longer than the communication range of NFC. The communication range of the mutual-recognition wireless communication is ranged between several meters and ten meters, for example. The mutual-recognition wireless communication is one example of second wireless communication, and the communication controller 142 is one example of a third communication device.

The memory 144 stores a printable number, which will be described later, for each user. The display 7 displays a printable number for each user ID at an appropriate timing, e.g., a timing when designation of a particular user ID is accepted (noted that this situation will be described later in detail). The ROM of the memory 144 stores various programs including a printing program for executing processings represented in FIGS. 7, 8, and 10.

Functional Configuration of Tag Card

The tag card C is a medium for NFC communication and includes a tag antenna 151 and an IC circuit 150. The IC circuit 150 includes a memory 155 and a tag controller 157.

The memory 155 stores information such as user IDs. The memory 155 is connected to the tag controller 157. The memory 155 and the tag antenna 151 are controlled by the tag controller 157.

The tag controller 157 controls the tag antenna 151 to perform NFC communication with the first antenna 141a of the printer 1 to transmit and receive information to and from the printer 1. This NFC communication uses a band of 13.56 MHz, for example. When the user holds the tag card C near and over the first antenna 141a of the printer 1 to establish NFC communication between the tag card C and the printer 1, the user ID stored in the memory 155 is transmitted to the printer 1 via the tag antenna 151. When this user ID is received by the printer 1 via the first antenna 141a, the printer 1 designates the particular user ID.

Functional Configuration of Operation Terminal

The operation terminal 200 includes: a central processing unit (CPU) 203; a memory 204 such as a RAM or a ROM; the operation interface 202; the display 201; a large-capacity storage 205 configured to store various kinds of information; and a mutual-recognition wireless communication controller 206 provided with a terminal-side antenna 206a.

The CPU 203 controls the mutual-recognition wireless communication controller 206 to execute processings for transferring various kinds of information, such as a processing for transmitting print data from the operation terminal 200, over the mutual-recognition wireless communication via the terminal-side antenna 206a and the access point ACP.

The CPU 203 is configured to execute a signal processing according to programs stored in the ROM while using a temporary storage function of the RAM. The CPU 203 thereby transmits and receives instruction signals and information signals to and from the printer 1.

The large-capacity storage 205 (or the memory 204) stores programs for converting a print instruction to a printer code (noted that detailed description therefor is omitted), for each form such as a style and a font of a character.

BACKGROUND

The printer 1 according to the present embodiment is used in a state in which the printer 1 is connected to the operation terminal 200 as described above. That is, the user operates the operation interface 202 of the operation terminal 200 to instruct the operation terminal 200 to create print data based on a print layout on the printing tape 103 which is desired by the user (e.g., a print layout created using a template), and the operation terminal 200 transmits the created print data to the printer 1. The printer 1 performs printing on the printing tape 103 based on the received print data and cuts the created printed-label tape 109 to create a printed label.

In the printer 1, the printable number, which is the number of printed labels allowed to be created, is determined for each user in view of increased security, for example. Specifically, the memory 144 stores the latest printable number for each user such that the printable number is associated with the user ID of the user. The user ID is one example of user-identification information. The user is allowed to instruct creation of printed labels by up to the printable number associated with the own user ID.

In the case where the user instructs creation of the printed labels with limitation of the printable number assigned to the user, it is convenient if the printed labels can be created not only by one printer 1 (e.g., the printer 1A) but also another printer 1 (e.g., the printer 1B) with compliance with the limitation.

Allocation in Present Embodiment

In view of the above-described circumstance, when creating printed labels with limitation of the printable number assigned to the user, in the present embodiment, at least a portion of the printable number stored in the memory 144 of the printer 1A may be allocated to the printer 1B. This operation will be described below.

Figure 6A:
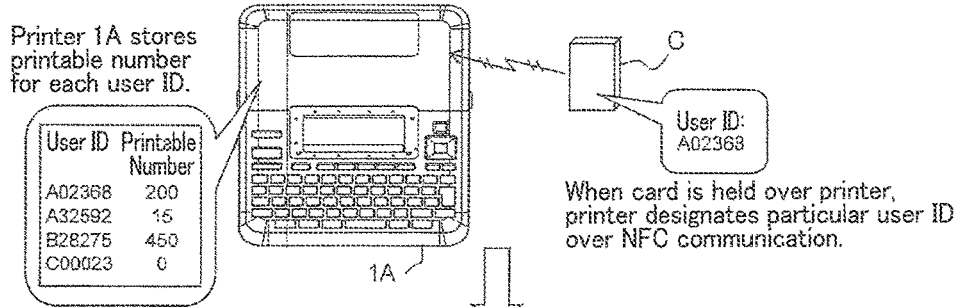
FIGS. 6A through 6D are views for explaining allocation of a half of a printable number for a designated ID, from one printer to another printer.

For example, as illustrated in FIG. 6A, the memory 144 of the printer 1A stores the printable number assigned to each of the user IDs. In this example, the printable numbers "200", "15", "450", and "0" are stored in association with four user IDs "A02368", "A32592", "B28275", and "C00023", respectively. When a user (as one example of a first user) assigned with the user ID "A02368" (as one example of first-user-identification information) holds the tag card C over the printer 1A, the user ID "A02368" stored in the memory 155 of the tag card C is transmitted to the printer 1A over NFC communication, and the printer 1A designates the particular user ID "A02368".

Figure 6B:
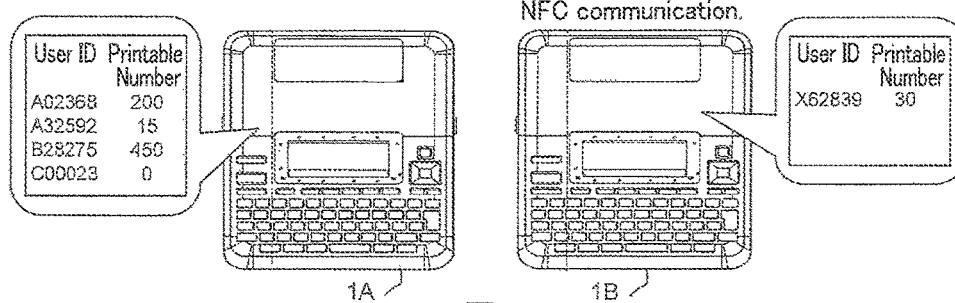

As illustrated in FIG. 6B, the user thereafter brings another printer 1B close to the printer 1A to establish NFC communication between the printers 1A, 1B. The memory 144 of the printer 1B stores the printable number "30" in association with the user ID "X62839", for example.

Figure 6C:
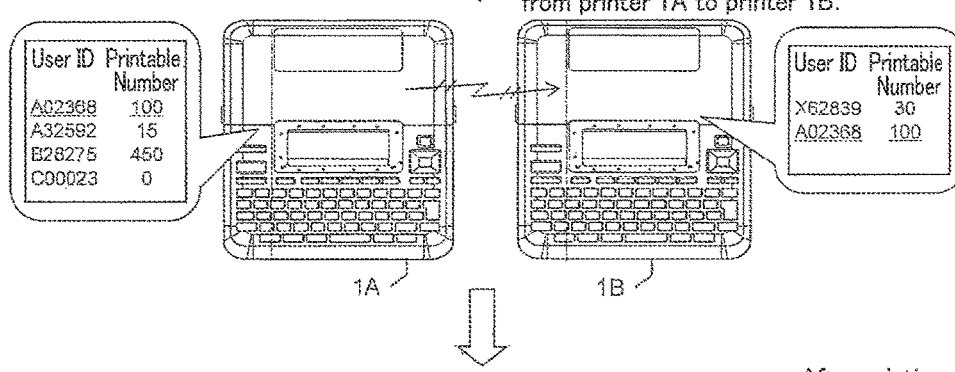

When the NFC communication between the printers 1A, 1B is established by the approach of the printer 1B to the printer 1A, as illustrated in FIG. 6C, a half of the printable number "200" (as one example of a first printable number) assigned to the designated user ID "A02368" is allocated from the printer 1A to the printer 1B. In other words, the printable number "100" (one example of at least a portion of the first printable number) is allocated from the printer 1A to the printer 1B. That is, the printable number "200" assigned to the user ID "A02368" is reduced by 100. As a result, the user ID "A02368" and the printable number "100" corresponding thereto (as one example of a second printable number) are added to the memory 144 of the printer 1B (see underlined characters). That is, 100 is added to the printable number "0" assigned to the user ID "A02368" in the printer 1B. It is noted that the printable number assigned to the other user ID ("X62839" in this example) is not changed ("30"). In the printer 1A, the printable number assigned to the designated user ID "A02368" is reduced from 200 by 100 to 100 (see underlined characters). The printable numbers assigned respectively to the other user IDs "A32592", "B28275", and "C00023" are not changed (A32592: 15, B28275: 450, and C00023: 0).

Figure 6D:
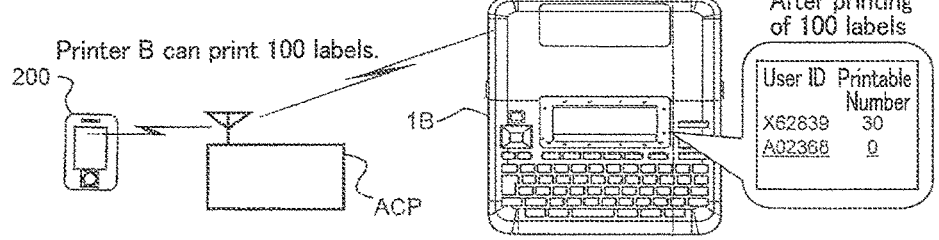

With the above-described allocation of the printable number to the printer 1B, as illustrated in FIG. 6D, the print data created by the operation terminal 200 instructed by the user is transmitted from the operation terminal 200 to the printer 1B via the access point ACP over mutual-recognition wireless communication. The printer 1B receives the transmitted print data and creates a printed label or labels based on the received print data. This allows the user to cause the printer 1B to perform printing to create up to one-hundred printed labels. When the one-hundred printed labels are created, as illustrated in FIG. 6D, the printable number assigned to the user ID "A02368" which is stored in the memory 144 of the printer 1B becomes zero (see underlined characters).

Control Procedure of Printer

There will be next described processings executable by the control circuits 143 of the printers 1A, 1B to achieve the techniques described above.

Control Procedure of Printer 1A

Figure 7:
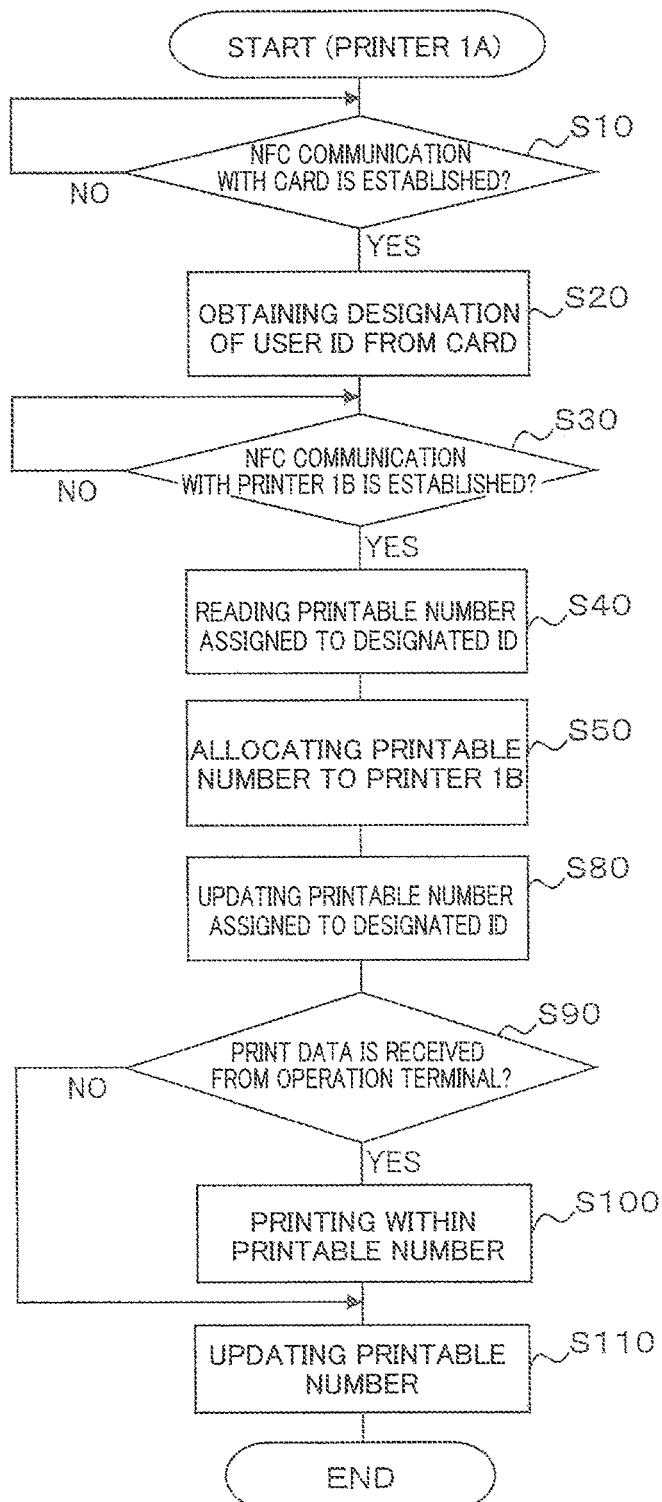
FIG. 7 is a flowchart representing processings to be executed by a control circuit of the printer from which a portion of the printable number is to be allocated.

There will be first described, with reference to FIG. 7, processings executable by the control circuit 143 of the printer 1A from which the printable number is allocated.

The flow in FIG. 7 begins with S10 at which the control circuit 143 determines in a well-known manner whether NFC communication between the tag card C and the printer 1A is established in response to user's operation of holding the tag card C over the printer 1A as described above. The printer 1A corresponds to the first printing apparatus in this case. When the NFC communication is not established (S10: NO), the control circuit 143 repeats this processing. When the NFC communication is established (S10: YES), the user ID stored in the memory 155 of the tag card C (the user ID "A02368" in the above-described example illustrated in FIG. 6A) is transmitted to the printer 1A over the NFC communication, and this flow goes to S20.

The control circuit 143 at S20 accepts and obtains designation of the user ID transmitted from the tag card C over the NFC communication. The processing at S20 is one example of a designation accepting processing. Upon completion of the processing at S20, this flow goes to S30.

In acceptance of the user ID at S20, the control circuit 143 may control the display 7 to display numeric information on the printable number corresponding to the user ID ("200" corresponding to "A02368" in the above-described example). This processing is one example of a number displaying processing.

The control circuit 143 at S30 determines in a well-known manner whether NFC communication between the printers 1A, 1B is established in response to user's operation of holding the printer 1B over the printer 1A as described above. The printer 1B corresponds to the second printing apparatus in this case. When the NFC communication with the printer 1B is not established (S30: NO), the control circuit 143 repeats this processing. When the NFC communication is established (S30: YES), this flow goes to S40. The processing at S30 is one example of an establishment determining processing.

The control circuit 143 at S40 reads the printable number assigned to the user ID obtained at S20 ("200" assigned to "A02368" in the above-described example illustrated in FIG. 6A), from the memory 144. The user ID obtained at S20 may be hereinafter referred to as "designated ID". Upon completion of the processing at S40, this flow goes to S50.

The control circuit 143 at S50 allocates a half of the printable number assigned to the designated ID which is read at S40, to the printer 1B over the NFC communication via the NFC communication device 141. In the above-described example, the control circuit 143 allocates "100", which is a half of "200", to the printer 1B as illustrated in FIG. 6C. This processing is one example of a number allocating processing. It is noted that this number allocating processing may be continued until the NFC communication is terminated by user's operation of moving the printers 1A, 1B away from each other (see a modification illustrated in FIGS. 9 and 10 which will be described below). As a result of the number allocating processing, the printable number assigned to the designated ID ("100" assigned to "A02368" in the above-described example) is added for the user ID in the memory 144 in the printer 1B. In other words, the printer 1B is authorized to create printed labels (100 labels in the above-described example) by the printable number based on an operation of the user assigned with the designated ID. It is noted that, when the tag card C is held over the printer 1A, at least a portion of the printable number assigned to the designated ID may be allocated from the printer 1B to the printer 1A. Upon completion of the processing at S50, this flow goes to S80.

In the allocation at S50, the control circuit 143 may control the display 7 to display numeric information on the printable number assigned to the designated ID. In the above-described example, the control circuit 143 may control the display 7 to display "200" assigned to "A02368" or "100" that represents the number by which the printable number is reduced by the allocation. This processing is another example of the number displaying processing.

The control circuit 143 at S80 updates the printable number assigned to the designated ID ("A02368" in the above-described example) which is stored in the memory 144, by using the allocation in the number allocating processing at S50 (reduction by 100 in the above-described example). Upon completion of the processing at S80, this flow goes to S90.

The control circuit 143 at S90 determines whether print data transmitted based on user's operation of the operation terminal 200 is received via the second antenna 142a over the mutual-recognition wireless communication via the access point ACP. The processing at S90 is one example of a data receiving processing. When the print data is received (S90: YES), this flow goes to S100. When no print data is received (S90: NO), this flow goes to S110.

The control circuit 143 at S100 controls the tape-conveying-roller drive shaft 108 and the print head 23 to perform printing on the printing tape 103 based on the print data received at S90 within the printable number updated at S80. In the above-described example, the printing is performed on up to 100 labels after the printable number assigned to the user ID "A02368" is reduced from 200. The processing at S100 is one example of a printing processing. Upon completion of the processing at S100, this flow goes to S110.

When the print data is received at S90, the control circuit 143 at S110 further reduces the printable number assigned to the designated ID which is updated at S80 ("100" assigned to "A02368" in the above-described example) by the number by which printing is performed at S100, and then updates the printable number assigned to the designated ID in the memory 144 by using the number by which printing is performed. When no print data is received at S90, the control circuit 143 at S110 updates the printable number assigned to the designated ID in the memory 144 by using the printable number assigned to the designated ID which is updated at S80 ("100" assigned to "A02368" in the above-described example). Upon completion of the processing at S110, this flow ends.

Control Procedure of Printer 1B

Figure 8:
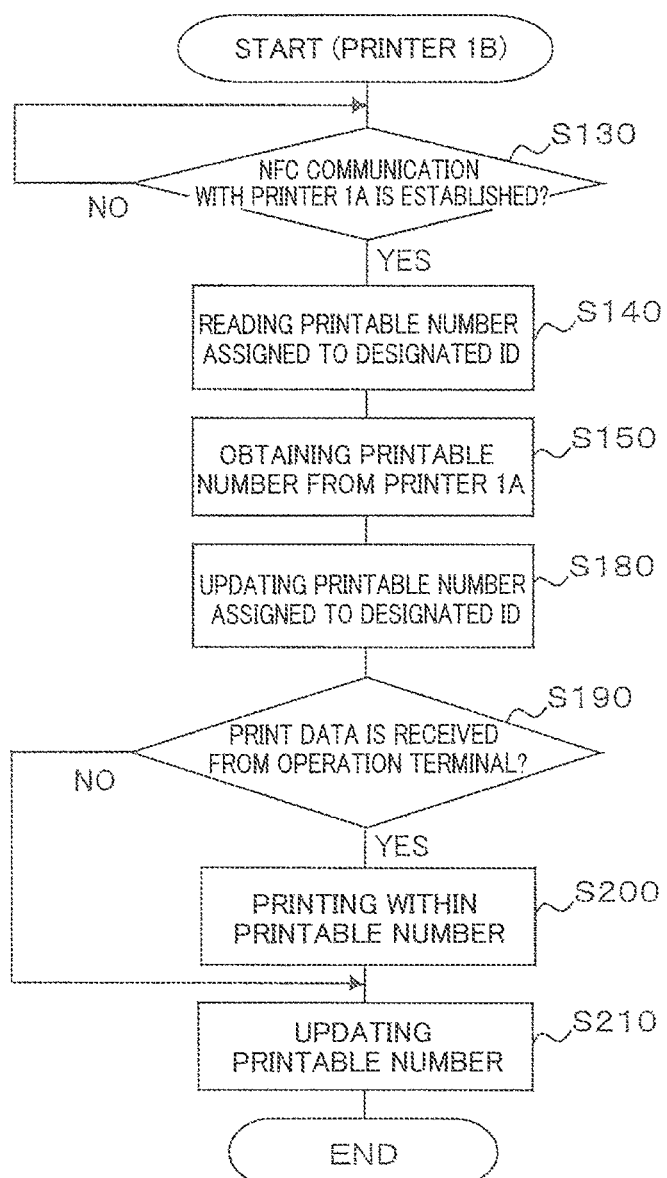
FIG. 8 is a flowchart representing processings to be executed by a control circuit of the printer to which a portion of the printable number is to be allocated.

There will be first described, with reference to FIG. 8, processings executable by the control circuit 143 of the printer 1B to which the printable number is allocated.

As in the processing at S30 in FIG. 7, the control circuit 143 at S130 determines in a well-known manner whether NFC communication between the printers 1A, 1B is established in response to user's operation of holding the printer 1B over the printer 1A as described above. It is noted that the printer 1A corresponds to the first printing apparatus in this case. When the NFC communication with the printer 1A is not established (S130: NO), the control circuit 143 repeats this processing. When the NFC communication is established (S130: YES), this flow goes to S140.

As in the processing at S40 in FIG. 7, the control circuit 143 at S140 reads, from the memory 144, the printable number assigned to the designated ID which is obtained from the printer 1A over the NFC communication established at S130. In the above-described example, as illustrated in FIG. 6B, since the user ID "A02368" and the printable number assigned thereto are not stored in the printer 1B, the control circuit 143 reads zero. Upon completion of the processing at S140, this flow goes to S150.

As in the processing at S50 in FIG. 7, the control circuit 143 at S150 obtains the printable number assigned to the designated ID and allocated from the printer 1A at S50 in FIG. 7, over the NFC communication via the NFC communication device 141. In the above-described example, the control circuit 143 obtains "100" for the user ID "A02368". Upon completion of the processing at S150, this flow goes to S180.

As in the processing at S80 in FIG. 7, the control circuit 143 at S180 updates the printable number assigned to the designated ID which is read at S140 ("A02368" in the above-described example) by using the printable number obtained at S150 (increase of 100 in the above-described example). Upon completion of the processing at S180, this flow goes to S190.

As in the processing at S90 in FIG. 7, the control circuit 143 at S190 determines whether print data transmitted based on user's operation of the operation terminal 200 is received via the second antenna 142a over the mutual-recognition wireless communication via the access point ACP. The processing at S190 is another example of the data receiving processing. When the print data is received (S190: YES), this flow goes to S200. When no print data is received (S190: NO), this flow goes to S210.

As in the processing at S100 in FIG. 7, the control circuit 143 at S200 controls the tape-conveying-roller drive shaft 108 and the print head 23 to perform printing on the printing tape 103 based on the print data received at S190 within the printable number updated at S180. In the above-described example, the printing is performed on up to 100 labels after the printable number assigned to the user ID "A02368" is increased from zero. The processing at S200 is another example of the printing processing. Upon completion of the processing at S200, this flow goes to S210.

As in the processing at S110 in FIG. 7, when the print data is received at S190, the control circuit 143 at S210 further reduces the printable number assigned to the designated ID which is updated at S180 ("100" assigned to "A02368" in the above-described example) by the number by which printing is performed at S200, and then updates the printable number assigned to the designated ID in the memory 144 by using the number by which printing is performed. When no print data is received at S190, the control circuit 143 at S210 updates the printable number assigned to the designated ID in the memory 144 by using the printable number assigned to the designated ID which is updated at S180 ("100" assigned to "A02368" in the above-described example). Upon completion of the processing at S210, this flow ends.

Effects

In the printer 1 according to the present embodiment as described above, after designation of the designated ID by the user is accepted at S20, when the NFC communication is established between the NFC communication device 141 of the printer 1A and the NFC communication device 141 of the printer 1B, at least a portion of the printable number assigned to the designated ID is allocated from the printer 1A to the printer 1B over the established NFC communication. This configuration enables the user to instruct the printer 1B to create the printed labels by up to the number allocated to the printer 1B as described above (S200 in FIG. 8). This improves the convenience to the user.

In the present embodiment, NFC communication having a short communication range is used for the allocation from the printer 1A to the printer 1B.

This configuration enables the user to perform: the transmission print data from the operation terminal 200 to the printer 1 over the mutual-recognition wireless communication having a relatively long communication range, such as Wi-Fi or a wireless LAN; and the allocation of the printable number between the printers 1A, 1B over the NFC communication having a relatively short communication range.

In the present embodiment, when the user designates a particular user ID, the printer 1 accepts the designation via the NFC communication device 141 over NFC communication from the tag card C.

With this configuration, the user only has to bring the tag card C stored in the user ID close to the printer 1 to transmit the user ID to the printer 1 over the NFC communication to designate the user ID.

In the present embodiment, a half of the printable number assigned to the designated ID is allocated from the printer 1A to the printer 1B.

This configuration enables the user to bring the printers 1A, 1B close to each other to transfer a half of the printable number assigned to the user and remaining in the printer 1A at the time, to the printer 1B. In the above-described example, a half of "200" can be transferred to the printer 1B.

In the present embodiment, the display 7 displays numeric information on the printable number assigned to the designated ID in the printer 1A (the value "200" corresponding to "200" assigned to the user ID "A02368" in the above-described example) when the designation of the user ID is accepted at S20 or when the printable number is allocated at S50.

This enables the user to visually recognize the latest information on the printable number in the printer 1 upon the designation of the user ID or before and after the allocation.

While the embodiment has been described above, it is to be understood that the disclosure is not limited to the details of the illustrated embodiment, but may be embodied with various changes and modifications, which may occur to those skilled in the art, without departing from the spirit and scope of the disclosure. There will be described modifications. It is noted that the same reference numerals as used in the above-described embodiment are used to designate the corresponding elements of the modifications, and an explanation of which is dispensed with or simplified.

Modifications (1) Case where Amount of Printable Number to be Allocated is in Proportional to Time of NFC Communication A half of the printable number assigned to the designated ID is allocated from the printer 1A to the printer 1B in the above-described embodiment, but the present disclosure is not limited to this configuration. For example, a printable number to be allocated may be in proportional to an elapsed time of NFC communication. FIGS. 9A-9D illustrate this modification.

Figure 9A:
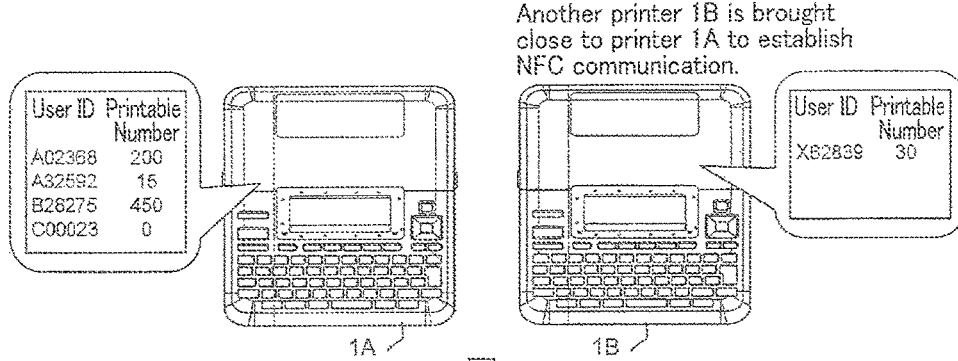
FIGS. 9A through 9D are views for explaining allocation in a modification in which an amount of the printable number to be allocated is in proportional to a time of NFC communication.

In the example illustrated in FIG. 9A, as in the above-described embodiment, the memory 144 of the printer 1A stores the printable numbers "200", "15", "450", and "0" in association with the user IDs "A02368", "A32592", "B28275", and "C00023", respectively. Likewise, the memory 144 of the printer 1B stores the printable number "30" in association with the user ID "X62839". In this state, for example, the user brings another printer 1B close to the printer 1A to establish NFC communication between the printers 1A, 1B as in FIG. 6B.

Figure 9B:
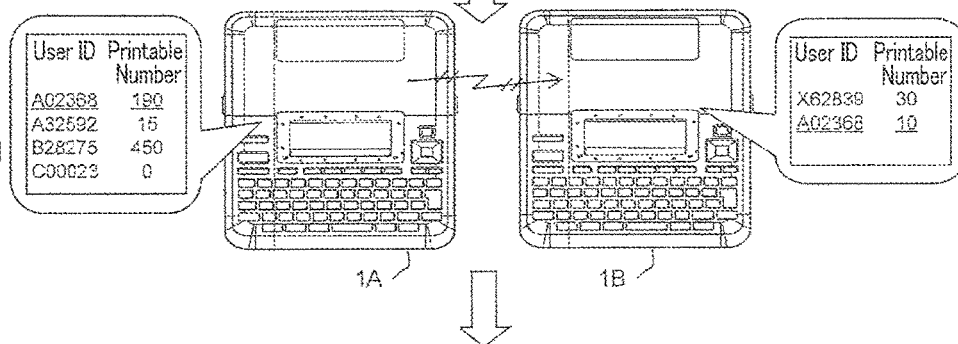

When one second has elapsed from the establishment of the NFC communication, as illustrated in FIG. 9B, a particular percent of the printable number assigned to the designated ID is allocated from the printer 1A to the printer 1B. In this example, "10" as 5% of "200" is allocated. As a result, the designated ID "A02368" and the printable number "10" assigned thereto are added to the printer 1B (see underlined characters). The printable number assigned to the other user ID "X62839" is not changed. In the printer 1A, the printable number assigned to the designated ID is reduced by the number allocated to the printer 1B. In the above-described example, the printable number is reduced from 200 by 10 to 190 (see underlined characters). The printable numbers assigned respectively to the other user IDs "A32592", "B28275", and "C00023" are not changed.

Figure 9C:
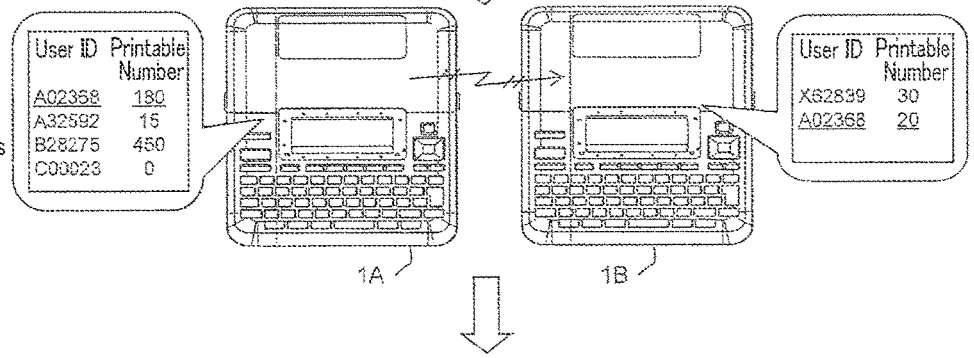

When one second has thereafter elapsed (in other words, two seconds have elapsed from the establishment of the NFC communication), as illustrated in FIG. 9C, the above-described particular percent of the printable number assigned to the designated ID is further allocated from the printer 1A to the printer 1B. In this example, "10" is further allocated. As a result, "10" is added to the printable number assigned to the designated ID "A02368" in the printer 1B, so that the printable number becomes "20" (see underlined characters). In the printer 1A, the printable number assigned to the designated ID is further reduced by the number allocated to the printer 1B. In the above-described example, the printable number is further reduced from 190 by 10 to 180 (see underlined characters).

Figure 9D:
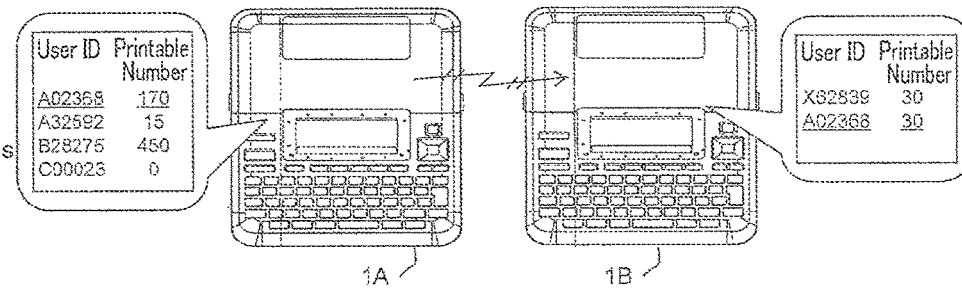

When one second has thereafter elapsed (in other words, three seconds have elapsed from the establishment of the NFC communication), as illustrated in FIG. 9D, the above-described particular percent of the printable number assigned to the designated ID is further allocated from the printer 1A to the printer 1B. In this example, "10" is further allocated. As a result, "10" is added to the printable number assigned to the designated ID "A02368" in the printer 1B, so that the printable number becomes "30" (see underlined characters). In the printer 1A, the printable number assigned to the designated ID is further reduced by the number allocated to the printer 1B. In the above-described example, the printable number is further reduced from 180 by 10 to 170 (see underlined characters).

There will be described, with reference to FIG. 10, processings executable by the control circuit 143 of the printer 1A from which the printable number is allocated, to achieve the techniques in the above-described modification.

Figure 10:
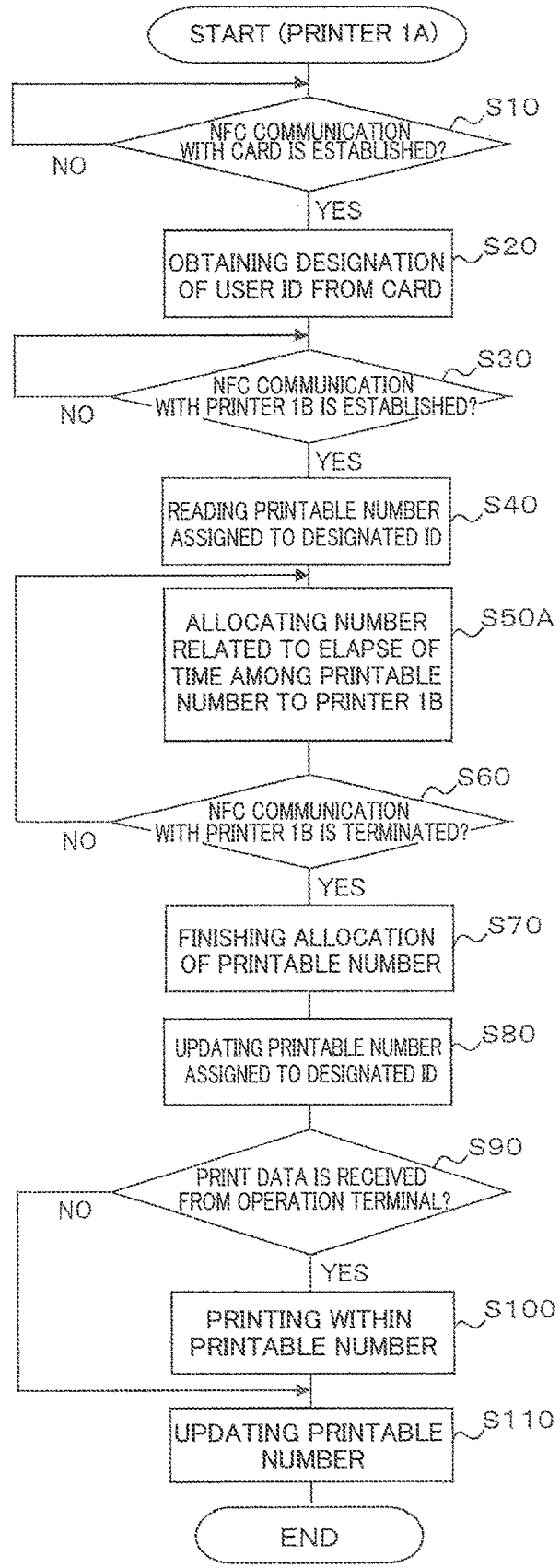
FIG. 10 is a flowchart representing processings to be executed by the control circuit of the printer from which a portion of the printable number is to be allocated.

The flow in FIG. 10 is different from the flow in FIG. 7 in that S60 and S70 are newly added between S50 and S80 in FIG. 7, and S50 in FIG. 7 is replaced with S50A. In the flow in FIG. 10, the processing S50A is executed after execution of the processings at S10-S40.

The control circuit 143 at S50A starts allocating a number related to an elapse of time from the establishment of the NFC communication at S10, from the printable number assigned to the designated ID which is read at S40 in the printer 1A, to the printer 1B over the NFC communication via the NFC communication device 141. For example, the control circuit 143 starts allocating "10" each time when one second has elapsed (see FIGS. 9A-9D). The printer 1B corresponds to the second printing apparatus in this case. It is noted that this number allocating processing is continued until the NFC communication is terminated by user's operation of moving the printers 1A, 1B away from each other (see S60 and S70 which will be described below). Upon completion of the processing at S50A, this flow goes to S60.

The control circuit 143 at S60 determines in a well-known manner whether NFC communication between the printers 1A, 1B is terminated in response to user's operation of separating or moving the printer 1B from or away from the printer 1A as described above. The processing at S60 is one example of a termination determining processing. When the NFC communication with the printer 1B is not terminated (S60: NO), this flow returns to S50A at which the control circuit 143 allocates a number related to the elapse of time, to the printer 1B, and the control circuit 143 then executes the termination determining processing at S60 again. When the NFC communication with the printer 1B is terminated (S60: YES), this flow goes to S70.

The control circuit 143 at S70 finishes the allocation of the printable number from the printer 1A to the printer 1B, which is started at S50A. It is noted that the allocation of the printable number which is started at S50A and finished at S70 is another example of the number allocating processing. Upon completion of the processing at S70, this flow goes to S80. Since the processings at S80-S110 are similar to those at FIG. 7, an explanation thereof is dispensed with.

In the present modification, as described above, a number related to an elapse of time from establishment of NFC communication among the printable number assigned to the designated ID is allocated from the printer 1A to the printer 1B. With this configuration, in the case where the printers 1A, 1B are brought close to each other for a short time, only a small amount of the printable number remaining in the printer 1A can be allocated to the printer 1B, and in the case where the printers 1A, 1B are brought close to each other for a long time, a large amount of the printable number remaining in the printer 1A can be allocated to the printer 1B. It is noted that, when the tag card C is held over the printer 1A, the printable number assigned to the designated ID and related to the elapsed time may be allocated from the printer 1B to the printer 1A.

In the present modification, the control circuit 143 determines whether the NFC communication is terminated by movement of the printers 1A, 1B away from each other, and when the control circuit 143 determines that the NFC communication is terminated, the control circuit 143 finishes the allocation of the printable number. This configuration enables the user to start allocation of the printable number by bringing the printers 1A, 1B close to each other and then finish the allocation by moving the printers 1A, 1B away from each other at an appropriate timing to terminate the NFC communication between the NFC communication devices 141.

(2) Case where Printable Numbers of Two Printers are Made Equal

Figure 11A:
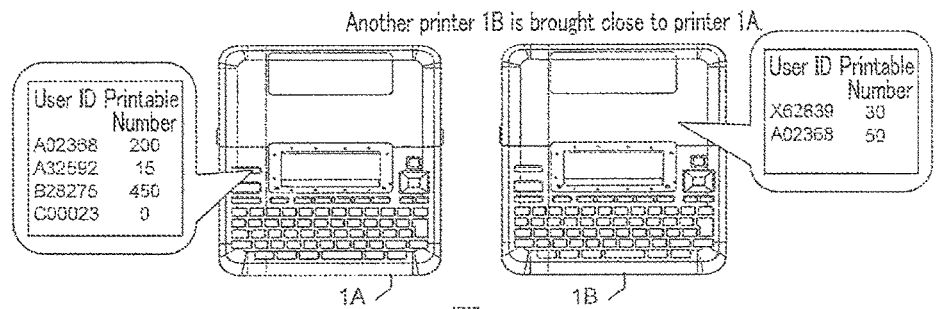
FIGS. 11A and 11B are views for explaining allocation in a modification in which the printable numbers of the respective two printer are made equal to each other.
Figure 11B:
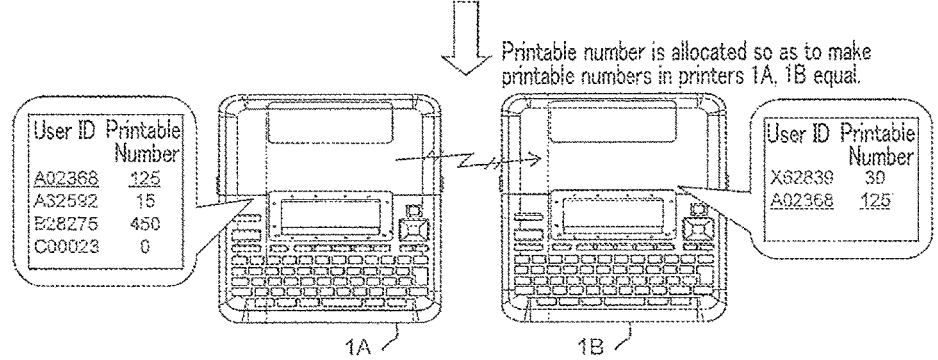

FIGS. 11A and 11B illustrate the present modification. In the example illustrated in FIG. 11A, the memory 144 of the printer 1A stores the printable numbers "200", "15", "450", and "0" in association with the user IDs "A02368", "A32592", "B28275", and "C00023", respectively. The memory 144 of the printer 1B stores the printable numbers "30" and "50" in association with the user IDs "X62839" and "A02368".

In this state, when NFC communication between the printers 1A, 1B is established as in FIG. 6B, the printer 1A in the present modification obtains numeric information on the printable number assigned to the designated ID stored in the memory 144 of the printer 1B, over the NFC communication between the printers 1A, 1B. In this example, the printer 1A obtains the value "50" corresponding to the printable number "50" assigned to the user ID "A02368". This processing is one example of a numeric-information obtaining processing. As illustrated in FIG. 11B, "75" of the printable number "200" assigned to the designated ID in the printer 1A is then allocated to the printer 1B. As a result, the printable number assigned to the designated ID "A02368" in the printer 1A becomes "125", and the printable number assigned to the designated ID "A02368" in the printer 1B becomes "125" by increase of "75". That is, after the allocation, the printable number in the printer 1A from which the printable number is allocated and the printable number in the printer 1B to which the printable number is allocated are made equal to each other.

In the present modification, the user can bring the printer 1A and the printer 1B close to each other to allocate a half of the remaining printable number assigned to the user to the printer 1A and the other half to the printer 1B. It is noted that, when the tag card C is held over the printer 1A, the printable number assigned to the designated ID may be allocated from the printer 1B to the printer 1A to make the printable numbers in the printers 1A, 1B equal to each other.

In the case where there are three or more printers 1, the printable numbers in the three or more printers 1 may be made equal to one another by repeating the allocation among all the printers 1.

Figure 12A:
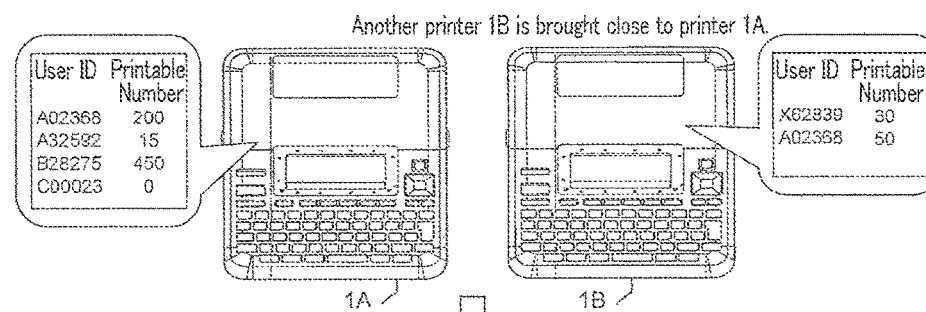
FIGS. 12A and 12B are views for explaining allocation in a modification in which all of the printable number in one printer is allocated to another printer.
Figure 12B:
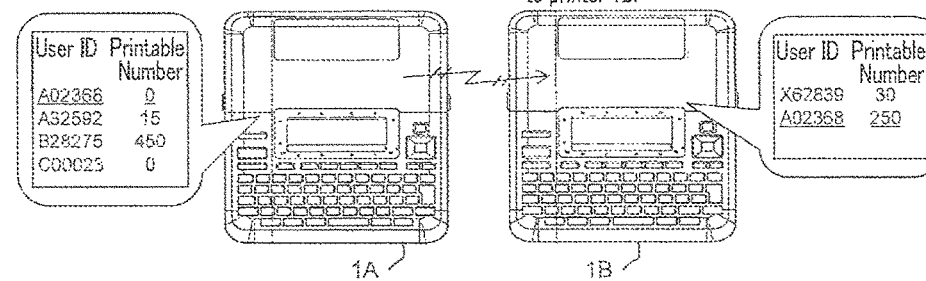

(3) Case where all of Printable Number in One Printer is Allocated to Another Printer FIGS. 12A and 12B illustrate the present modification. In the example in FIG. 12A, the memory 144 of the printer 1A stores the printable numbers "200", "15", "450", and "0" in association with the user IDs "A02368", "A32592", "B28275", and "C00023". The memory 144 of the printer 1B stores the printable numbers "30" and "50" in association with the user IDs "X62839" and "A02368".

In this state, when NFC communication between the printers 1A, 1B is established, as illustrated in FIG. 12B, all of the printable number "200" assigned to the designated ID in the printer 1A is allocated to the printer 1B. As a result, the printable number assigned to the designated ID "A02368" in the printer 1A becomes zero, and the printable number assigned to the designated ID "A02368" in the printer 1B becomes "250" by increase of "200". That is, all of the printable number in the printer 1A is allocated to the printer 1B, and the allocated printable number and the printable number stored in the printer 1B before the allocation are added together in the printer 1B.

In the present modification, the user can bring the printer 1A and the printer 1B close to each other to allocate all of the printable number stored in the printer 1A at the time, to the printer 1B. It is noted that, when the tag card C is held over the printer 1A, all of the printable number assigned to the designated ID in the printer 1B may be allocated to the printer 1A.

Even in the case where there are three or more printers 1, all of the printable number is allocated to one of the printer 1 by repeating the allocation among all the printers 1.

(4) Case where Printable Numbers are Added Together or Equally Divided Each Time when Printers are Brought Close to Each Other FIGS. 13A-13D illustrate the present modification. In the example in FIG. 13A, the memory 144 of the printer 1A stores the printable numbers "200", "15", "450", and "0" in association with the user IDs "A02368", "A32592", "B28275", and "C00023", respectively. The memory 144 of the printer 1B stores the printable numbers "30" and "50" in association with the user IDs "X62839" and "A02368".

Figure 13A:
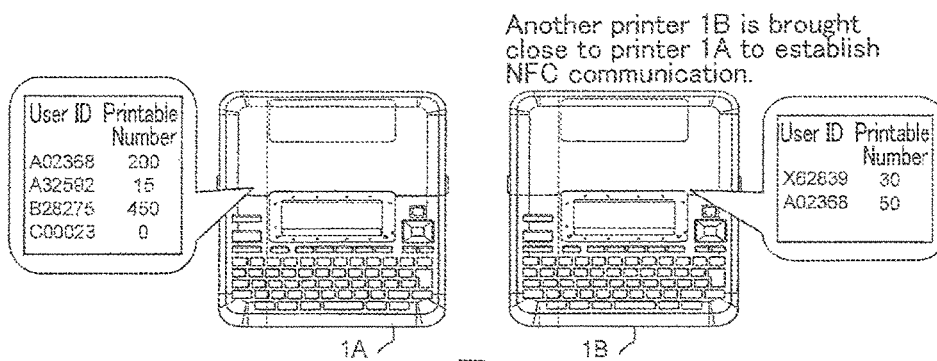
FIGS. 13A through 13D are views for explaining allocation in a modification in which the printable numbers are added together or equally divided each time when the printers are brought close to each other.
Figure 13B:
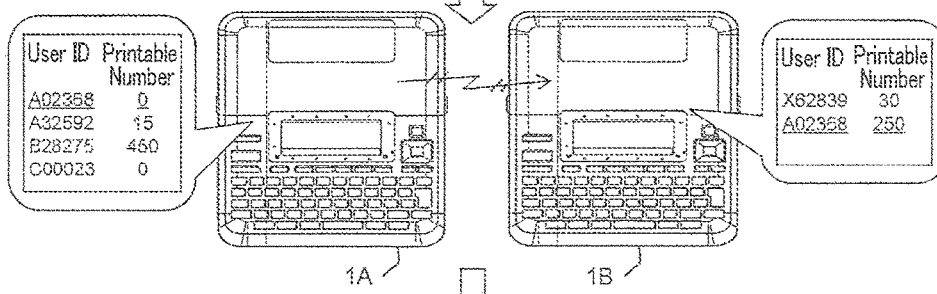

In this state, as illustrated in FIG. 13A, when the user has brought the printer 1B close to the printer 1A to establish NFC communication between the printer 1A and the printer 1B, as illustrated in FIG. 13B, all of the printable number "200" assigned to the designated ID ("A02368" in this example) is allocated to the printer 1B as in FIG. 11A. As a result, the printable number assigned to the designated ID in the printer 1A becomes zero, and the printable number assigned to the designated ID in the printer 1B becomes "250".

Figure 13C:
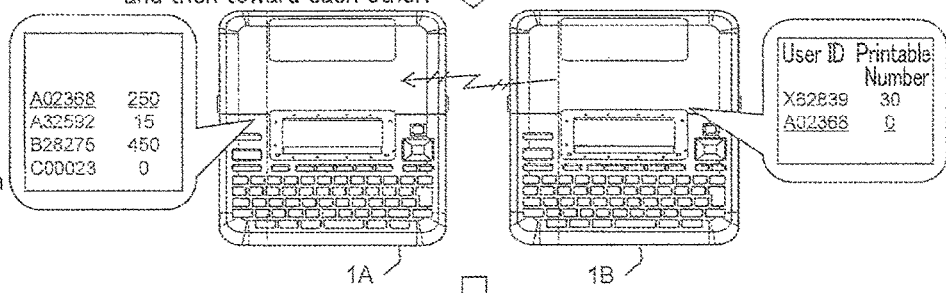

When the user has moved the printer 1B away from the printer 1A in the above-described state, the NFC communication between the printers 1A, 1B is terminated. The user thereafter brings the printer 1B close to the printer 1A to establish NFC communication between the printers 1A, 1B. In response, as illustrated in FIG. 13C, all of the printable number "250" assigned to the designated ID ("A02368" in this example) in the printer 1B is allocated to the printer 1A again. As a result, the printable number assigned to the designated ID in the printer 1B becomes zero, and the printable number assigned to the designated ID in the printer 1A becomes "250".

Figure 13D:
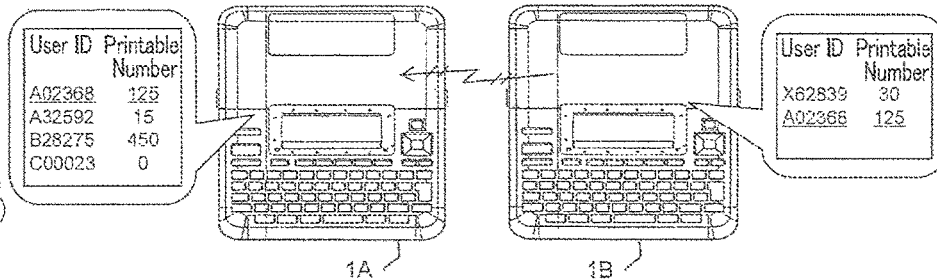

When the user has moved the printer 1B away from the printer 1A in the above-described state, the NFC communication between the printers 1A, 1B is terminated. The user thereafter brings the printer 1B close to the printer 1A to establish NFC communication between the printers 1A, 1B. In response, the printer 1B reads the value "0" as the printable number assigned to the designated ID ("A02368" in this example) which is stored in the memory 144 of the printer 1B. The printer 1B transmits the read value to the printer 1A. Thereafter, as illustrated in FIG. 13D, a half ("125") of the printable number "250" assigned to the designated ID in the printer 1A is allocated to the printer 1B. As a result, the printable number assigned to the designated ID in the printer 1B becomes "125", and the printable number assigned to the designated ID in the printer 1A becomes "125". That is, the printable number in the printer 1A and the printable number in the printer 1B made equal to each other for the designated ID.

In the present modification as described above, each time when the printers 1A, 1B are moved away from and then toward each other, the printable numbers assigned to the designated user ID are selectively added together or equally divided in order. This further improves the convenience to the user.

(5) Case where Printer to which Printable Number is Allocated is Allowed to Perform Printing by Number Exceeding Printable Number FIGS. 14A-14D illustrate the present modification. In the example in FIG. 14A, the memory 144 of the printer 1A stores the printable numbers "200", "15", "450", and "0" in association with the user IDs "A02368", "A32592", "B28275", and "C00023", respectively. The memory 144 of the printer 1B stores the printable numbers "30" in association with the user ID "X62839".

Figure 14A:
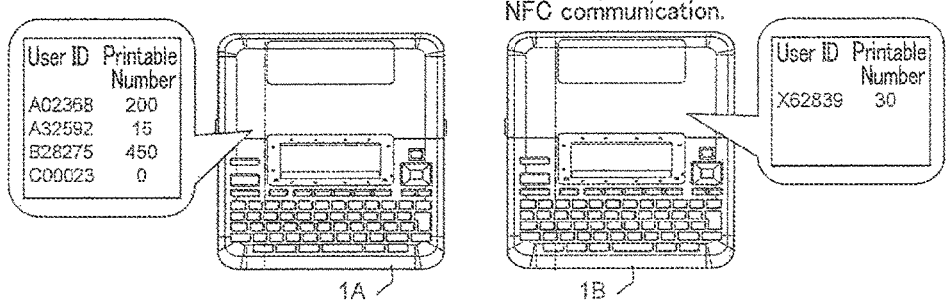
FIGS. 14A through 14D are views for explaining allocation and printing in a modification in which the printer to which a portion of the printable number has been allocated is allowed to perform printing by a number exceeding the printable number.
Figure 14B:
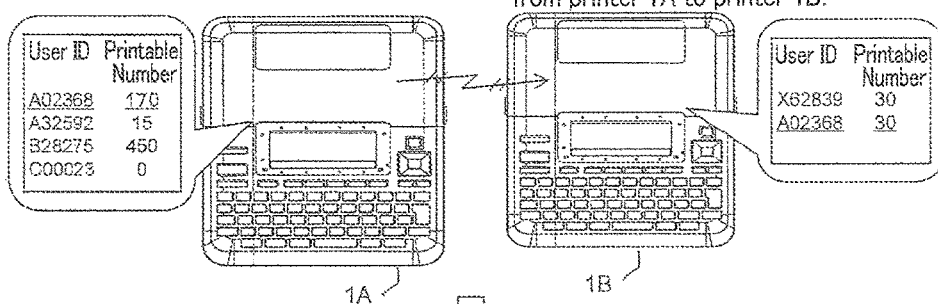

In this state, when NFC communication between the printers 1A, 1B is established, as illustrated in FIG. 14B, at least a portion of the printable number assigned to the designated ID in the printer 1A is allocated to the printer 1B. In this example, the printable number "30" is allocated. As a result, the printable number assigned to the designated ID "A02368" in the printer 1A becomes "170", and the printable number assigned to the designated ID "A02368" in the printer 1B becomes "30".

Figure 14C:
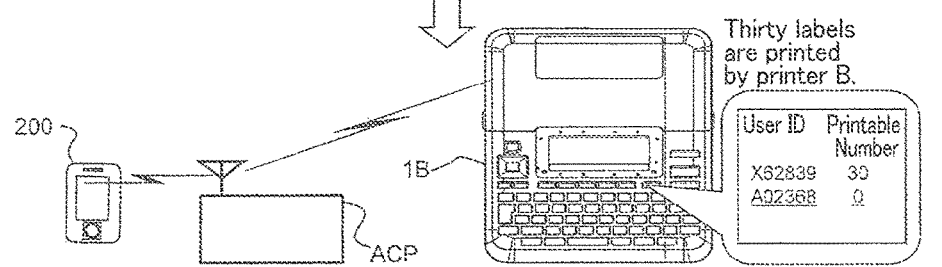

When the printable number is allocated to the printer 1B as described above, as illustrated in FIG. 14C, print data created by the operation terminal 200 in response to user's operation is transmitted from the operation terminal 200 to the printer 1B over the mutual-recognition wireless communication via the access point ACP. The printer 1B receives the transmitted print data to perform printing based on the print data to create a printed label. Since the printable number assigned to the designated ID "A02368" becomes "30", the user is allowed to instruct the printer 1B to perform printing to create up to thirty printed labels. When the thirty printed labels are created, as illustrated in FIG. 14C, the printable number assigned to the user ID "A02368" which is stored in the memory 144 of the printer 1B becomes zero (see underlined characters).

Figure 14D:
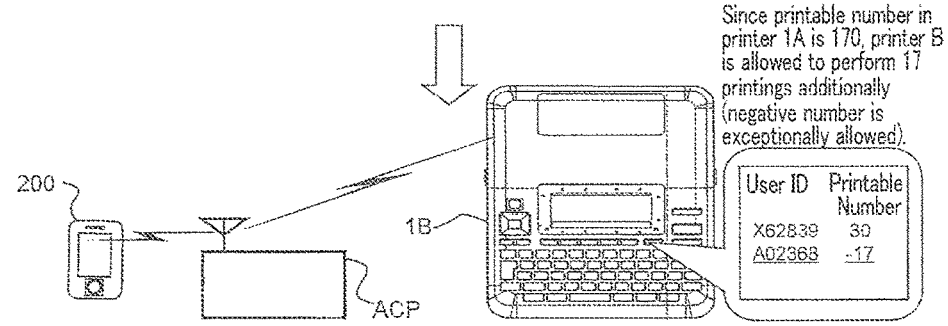

In this state, however, the printable number assigned to the designated ID in the printer 1A is "170". Thus, in the present modification, as illustrated in FIG. 14D, additional printing by a certain percent of the remaining printable number "170" in the printer 1A is exceptionally allowed in the printer 1B though the total number of printings exceeds the above-described printable number "30". In this example, the certain percent is 10%, and seventeen printings are additionally allowed. It is noted that a value of the remaining number is transmitted from the printer 1A to the printer 1B when the printable number is allocated in FIG. 14B. This processing is one example of a numeric-information transmitting processing. In this case, the printer 1B corresponds to the second printing apparatus, and the printer 1A corresponds to the first printing apparatus. The above-described processings allow the user to instruct the printer 1B to perform printing to create seventeen printed labels additionally. In the case where the seventeen printed labels are created additionally, as illustrated in FIG. 14D, the printable number assigned to the user ID "A02368" which is stored in the memory 144 of the printer 1B becomes "−17" (see underlined characters).

In the above-described example, even in the case where the printable number assigned to the designated ID in the printer 1B has become zero by creation of the printed labels after the allocation, a relatively large printable number remains in the printer 1A in the allocation. In the present modification, additional printing in the printer 1B is exceptionally allowed in this case, resulting in increased flexibility. This further improves the convenience to the user.

(6) Case Using Bluetooth Low Energy

In the present modification, the NFC communication is replaced with broadcast communication to allocate the printable number. For example, the broadcast communication uses Bluetooth Low Energy (BLE) having a communication range of less than or equal to 10 m. There will be described the present modification with reference to FIGS. 15 and 16.

Figure 15:
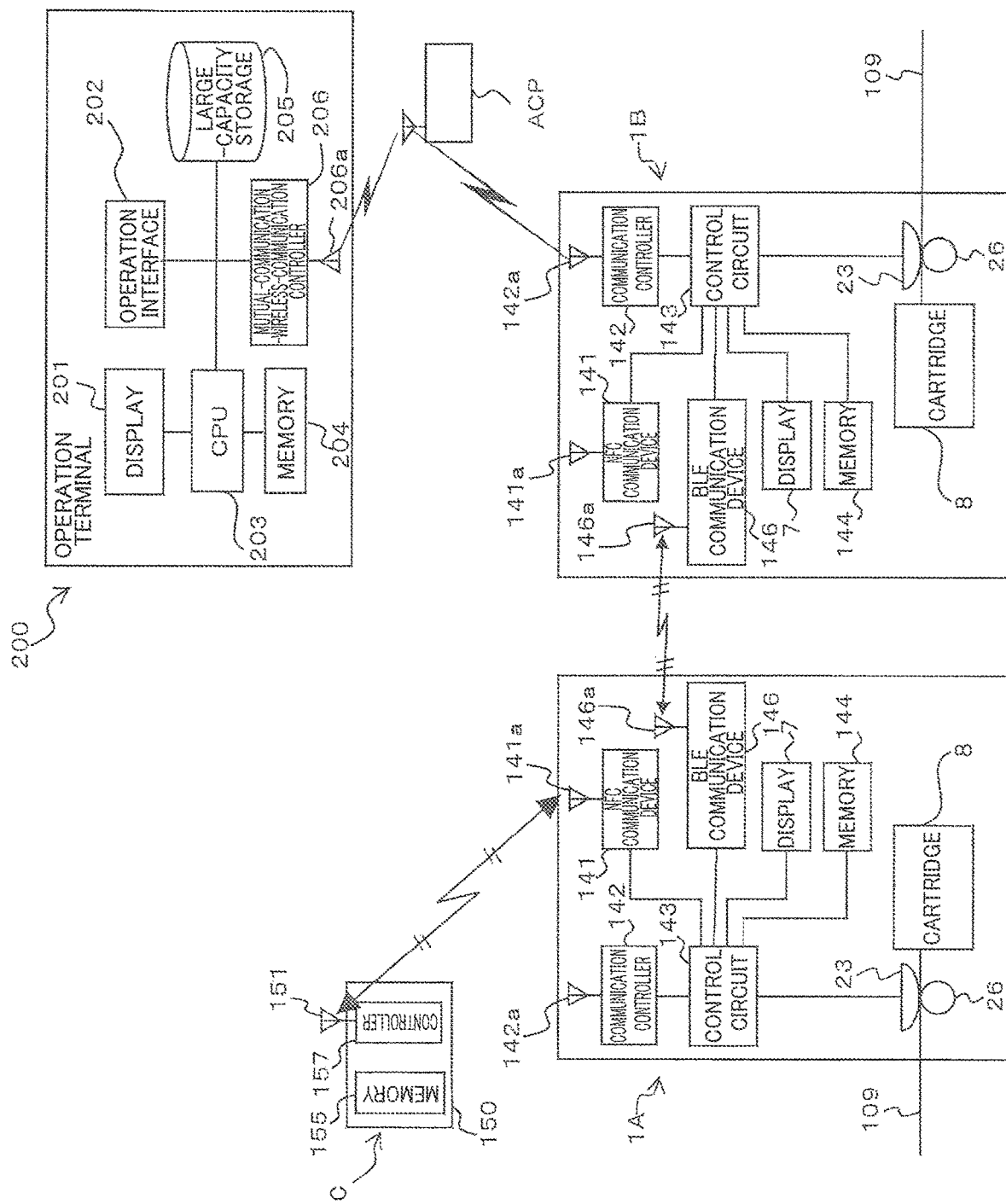
FIG. 15 is a block diagram illustrating functional configurations of printers, a tag card, and an operation terminal in a modification using Bluetooth Low Energy.

In the present modification, as illustrated in FIG. 15, each of the printers 1A, 1B further includes a communication device 146 for BLE (hereinafter referred to as "BLE communication device 146") and a third antenna 146a. The BLE communication device 146 is another example of the first communication device. The BLE communication device 146 controls the broadcast communication using Bluetooth Low Energy which is performed between the printers 1A, 1B via the third antennas 146a. This broadcast communication is another example of the first wireless communication.

The functional configurations of the respective printers 1A, 1B other than the additional components, and the functional configurations of the tag card C and the operation terminal 200 are the same as those in FIG. 5, respectively, and an explanation thereof is dispensed with.

Figure 16:
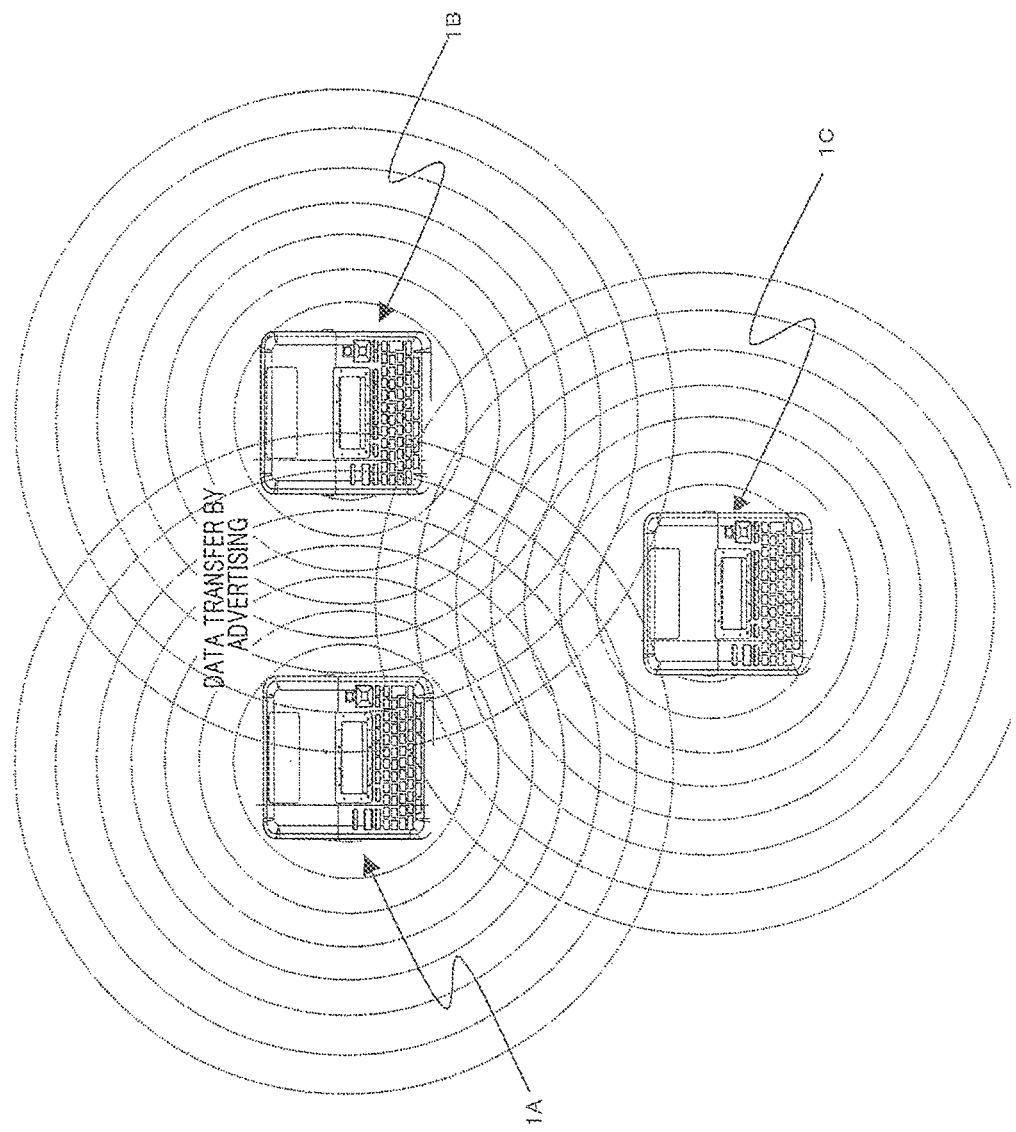
FIG. 16 is a view of a network connected to a plurality of printers over broadcast communication.

For example, as illustrated in FIG. 16, the printer 1A is connectable to the printer 1B over a network by the broadcast communication. In the example in FIG. 16, a printer different from the printers 1A, 1B (a printer 1C in FIG. 16) is disposed. The printer C has the same configuration and functions as those of the printers 1A, 1B.

As illustrated in FIG. 16, the printers 1A-1C capable of performing the broadcast communication form a network in the case where the printers 1A-1C are located within a range of radio waves for the broadcast communication. Each of the printers 1A-1C performs well-known advertising in which information required for management of the network is periodically transmitted between the own printer and another printer. Advertising over the broadcast communication allows data transfer among the printers 1A-1C.

In the present modification, though not described in detail, processings corresponding to the processings at S50 in FIG. 7, S150 in FIG. 8, and S50A in FIG. 10 are executed over the broadcast communication between two of the printers 1A-1C. This processing is yet another example of the number allocating processing.

The present modification as described above enables the user to allocate the printable number among the printers 1A-1C over the broadcast communication using BLE which has a relatively short communication range.

When the tag card C is held over one of the printers (e.g., the printer 1A) to designate the user ID, for example, the printable number assigned to the designated ID may be stored in the memory 144 of at least one printer different from the one printer (e.g., the printers 1B, 1C). In this case, a display instruction for instructing each of the printers 1B, 1C to display the printable number on the display 7 may be transmitted from the printer 1A to the printers 1B, 1C over the broadcast communication. This processing is one example of a display instructing processing.

In this case, the latest information on the printable number assigned to the designated ID is displayable on the display 7 of each of all the printers (the printers 1B, 1C in the above-described example) located within the range of the radio wave in the broadcast communication. As a result, in a state in which the printers 1A-1C are arranged at one place, the user can visually check the displays 7 of the printers 1 to easily select one of the printer 1 which has the largest printable number for the user, for example.

(7) Others

In the above-described embodiment and modifications, as described above, the printers 1A, 1B (and the printer 1C) have the same configuration and functions. Thus, the printer 1B may achieve the above-described functions and operations of the printer 1A, and the printer 1A may achieve the above-described functions and operations of the printer 1B, for example. In the case where the printer 1A serves as the first printing apparatus, the printer 1B serves as the second printing apparatus, and in the case where the printer 1B serves as the first printing apparatus, the printer 1A serves as the second printing apparatus.

In the above-described embodiment and modifications, the printer 1 performs printing on the printing tape 103 to create the printed label as the printed material by way of example, but the present disclosure is not limited to this configuration. For example, the present disclosure may be applied to a printer configured to print an image or characters on a normal printing medium such as a sheet of the A4, A3, B4, or B5 size. The same effects can be achieved in this case.

In the above-described description, each of the wordings "orthogonal", "parallel", "planar", and so on is not used in a strict sense. That is, tolerance and error in designing and manufacturing are allowed for these wordings, and the wordings "orthogonal", "parallel", "planar", and so on respectively mean "substantially orthogonal", "substantially parallel", "substantially planar", and so on.

While the terms "the same", "equal", "different", and the like may be used for dimensions and sizes in external appearance in the above-described description, these terms are not strictly used. That is, tolerance and error in design and manufacture are allowed, and "same", "equal", and "different" may be respectively interpreted as "substantially the same", "substantially equal", and "substantially different".

Each arrow in FIGS. 5 and 15 indicates one example of a flow of signals and does not limit a direction or directions of the flow of the signals.

Processings achieved by the present disclosure are not limited to the flows illustrated in FIGS. 7, 8, and 10. The processings may be added, removed, altered, combined, and reordered without departing from the spirit of the scope of the present disclosure.

The techniques in the above-described embodiment and modifications may be used in any combinations.

The disclosure is not limited to the details of the illustrated embodiment and modifications, but may be embodied with various changes and modifications, which may occur to those skilled in the art, without departing from the spirit and scope of the disclosure.

What is claimed is:

1. A printing system, comprising:
   a first printing apparatus; and
   a second printing apparatus,
   wherein the first printing apparatus comprises:
   a first conveyor configured to convey a first printing medium;
   a first printing device configured to perform printing on the first printing medium conveyed by the first conveyor;
   a first storage configured to store (i) user-identification information comprising at least first-user-identification information corresponding to a first user and (ii) numeric information indicating a printable number comprising at least a first printable number associated with the first-user-identification information;

a first communication device configured to perform communication using a first wireless communication method; and
a first controller,
wherein the second printing apparatus comprises:
a second conveyor configured to convey a second printing medium;
a second printing device configured to perform printing on the second printing medium conveyed by the second conveyor;
a second storage configured to store (i) user-identification information comprising at least the first-user-identification information and (ii) numeric information indicating a printable number comprising at least a second printable number associated with the first-user-identification information;
a second communication device configured to perform communication using the first wireless communication method; and
a second controller,
wherein the first controller of the first printing apparatus is configured to execute:
a designation accepting processing in which the first controller accepts designation of the first-user-identification information via the first communication device;
a first number allocating processing in which the first controller transmits first numeric information to the second printing apparatus in a state in which communication using the first wireless communication method is established between the first communication device of the first printing apparatus and the second communication device of the second printing apparatus by bringing one of the first printing apparatus and the second printing apparatus close to the other of the first printing apparatus and the second printing apparatus, and the first controller updates the first printable number based on the first numeric information, the first numeric information indicating at least a portion of the first printable number stored in the first storage and associated with the first user-identification information, of which designation is accepted in the designation accepting processing; and
a first printing limiting processing in which the first controller controls the first conveyor and the first printing device to perform printing on the first printing medium based on print data so as to limit the number of printed materials to be produced, to the first printable number, and
wherein the second controller of the second printing apparatus is configured to execute:
a second number allocating processing in which the second controller receives the first numeric information from the first printing apparatus and updates second numeric information based on the received first numeric information, the second numeric information indicating the second printable number stored in the second storage and associated with the first user-identification information; and
a second printing limiting processing in which the second controller controls the second conveyor and the second printing device to perform printing on the second printing medium based on print data so as to limit the number of printed materials to be produced, to the second printable number.

2. A printing apparatus,
wherein a first printing apparatus as the printing apparatus comprises:
a conveyor configured to convey a printing medium;
a printing device configured to perform printing on the printing medium conveyed by the conveyor;
a first storage configured to store (i) user-identification information comprising at least first-user-identification information corresponding to a first user and (ii) numeric information indicating a printable number comprising at least a first printable number associated with the first-user-identification information;
a first communication device configured to perform communication using a first wireless communication method; and
a first controller,
wherein the first controller is configured to execute:
a designation accepting processing in which the first controller accepts designation of the first-user-identification information via the first communication device;
a number allocating processing in which the first controller transmits first numeric information to a second printing apparatus different from the first printing apparatus in a state in which communication using the first wireless communication method is established between the first communication device of the first printing apparatus and a second communication device of the second printing apparatus by bringing one of the first printing apparatus and the second printing apparatus close to the other of the first printing apparatus and the second printing apparatus, and the first controller updates the first printable number based on the first numeric information, the first numeric information indicating at least a portion of the first printable number associated with the first user-identification information, of which designation is accepted in the designation accepting processing; and
a printing limiting processing in which the first controller controls the conveyor and the printing device to perform printing on the printing medium based on print data so as to limit the number of printed materials to be produced, to the first printable number.

3. The printing apparatus according to claim 2, wherein the first controller is configured to, in the number allocating processing, reduce the first numeric information from numeric information indicating the first printable number stored in the first storage.

4. The printing apparatus according to claim 2,
wherein the first controller is configured to execute an establishment determining processing in which the first controller determines whether the communication using the first wireless communication method between the first printing apparatus and the second printing apparatus is established, and
wherein the controller is configured to execute the number allocating processing when the first controller determines in the establishment determining processing that the communication using the first wireless communication method is established.

5. The printing apparatus according to claim 2, wherein the first controller is configured to, in the number allocating processing, transmit numeric information indicating a half of the first printable number associated with the first user-identification information, to the second printing apparatus.

6. The printing apparatus according to claim 2, wherein the first controller is configured to, in the number allocating processing, transmit, to the second printing apparatus, numeric information indicating a number related to a time elapsed from establishment of the communication using the first wireless communication method, among the first printable number associated with the first user-identification information.

7. The printing apparatus according to claim 6,
wherein the first controller is configured to execute a termination determining processing in which the first controller determines whether the establishment of the communication using the first wireless communication method is terminated by moving one of the first printing apparatus and the second printing apparatus away from the other of the first printing apparatus and the second printing apparatus, and
wherein the first controller is configured to, in the number allocating processing, terminate transmission of the numeric information indicating the number related to the time elapsed from the establishment, when the first controller determines that the establishment of the communication using the first wireless communication method is terminated.

8. The printing apparatus according to claim 2, further comprising a third communication device configured to perform communication using a second wireless communication method that allows communication having a communication range longer than that of the first wireless communication method,
wherein the first controller is configured to execute a data receiving processing in which the first printing apparatus receives the print data transmitted from an operation terminal, over the communication using the second wireless communication method, and
wherein the first controller is configured to, in the number allocating processing, transmit the first numeric information to the second printing apparatus over the communication using the first wireless communication method.

9. The printing apparatus according to claim 2,
wherein the first communication device is configured to communicate with the second printing apparatus over communication using a broadcast communication method, and
wherein the first controller is configured to, in the number allocating processing, transmit the first numeric information to the second printing apparatus over communication using the broadcast communication method via the first communication device.

10. The printing apparatus according to claim 8, wherein the first controller is configured to, in the designation accepting processing, accept the designation over the communication using the first wireless communication method via the first communication device.

11. The printing apparatus according to claim 2, wherein the first controller is configured to, in the number allocating processing, transmit numeric information indicating all of the first printable number associated with the first user-identification information, to the second printing apparatus.

12. The printing apparatus according to claim 2,
wherein the first controller is configured to execute a numeric-information obtaining processing in which the first controller obtains numeric information indicating the second printable number associated with the first-user-identification information, which is stored in a second storage of the second printing apparatus, and wherein the first controller is configured to, in the number allocating processing:
transmit, to the second printing apparatus, numeric information indicating a number obtained by subtracting numeric information indicating an average of the first printable number and the obtained second printable number, from numeric information indicating the first printable number; and
update the numeric information indicating the first printable number to the numeric information indicating the average.

13. The printing apparatus according to claim 2, wherein the first controller is configured to execute, with the number allocating processing, a numeric-information transmitting processing in which the first controller transmits, to the second printing apparatus, numeric information indicating a remaining number obtained by subtracting the first numeric information from numeric information indicating the first printable number stored in the first storage stored in the first printing apparatus and associated with the first user-identification information.

14. The printing apparatus according to claim 2, further comprising a first display,
wherein the first controller is configured to execute a number displaying processing in which the first controller controls the display to display numeric information indicating the first printable number associated with the first user-identification information in the first printing apparatus when the designation of the first-user-identification information is accepted in the designation accepting processing or when the number allocating processing is executed.

15. The printing apparatus according to claim 2, wherein the first controller is configured to execute a display instructing processing in which the first controller transmits a display instruction for instructing a second display of the second printing apparatus to display the second printable number for the second printing apparatus, to the second printing apparatus over the communication using the first wireless communication method when the designation of the first-user-identification information is accepted in the designation accepting processing.

16. A printing apparatus, wherein a second printing apparatus as the printing apparatus comprises: a conveyor configured to convey a printing medium; a printing device configured to perform printing on the printing medium conveyed by the conveyor; a storage configured to store (i) user-identification information comprising at least first-user-identification information corresponding to a first user and (ii) numeric information indicating a printable number comprising at least a second printable number associated with the first-user-identification information; a second communication device configured to perform communication using a first wireless communication method; and a controller,
wherein the controller is configured to execute: a number receiving processing in which the controller receives first numeric information from a first printing apparatus different from the second printing apparatus in a state in which communication using the first wireless communication method is established between the second communication device of the second printing apparatus and a first communication device of the first printing apparatus by bringing one of the first printing apparatus and the second printing apparatus close to the other of the first printing apparatus and the second printing apparatus, and the controller updates, based on the first numeric information, second numeric information indicating the second printable number stored in the storage and associated with the first user-identification information, the first numeric information indicating at least a portion of the first printable number associated with the first user-identification information; and a printing limiting processing in which the controller controls the conveyor and the printing device to perform printing on the printing medium based on print data so as to limit the number of printed materials to be produced, to the second printable number.

17. The printing apparatus according to claim 16, wherein the controller is configured to, in the number receiving processing, update the second numeric information by adding the first numeric information to the second numeric information indicating the second printable number stored in the storage.

18. The printing apparatus according to claim 16,
wherein the controller is configured to execute a numeric-information transmitting processing in which the controller transmits the second numeric information indicating the second printable number stored in the storage and associated with the first user-identification information, and
wherein the controller is configured to, in the number receiving processing, update the second numeric information by adding the received first numeric information to the second numeric information indicating the second printable number stored in the storage.

19. The printing apparatus according to claim 16,
wherein the controller is configured to, with the number receiving processing, receive numeric information indicating a remaining number obtained by subtracting the first numeric information from the first printable number, and
wherein the controller is configured to, in the printing limiting processing, allow the number of printed materials to be produced, to exceed the second printable number in accordance with the received numeric information indicating the remaining number.

20. The printing apparatus according to claim 16,
wherein the second printing apparatus further comprises a second display, and
wherein the controller is configured to control the second display to display the second numeric information indicating the second printable number when a display instruction is received from the first printing apparatus over the communication using the first wireless communication method.

21. A printing apparatus,
wherein a first printing apparatus as the printing apparatus comprises:
  a conveyor configured to convey a printing medium;
  a printing device configured to perform printing on the printing medium conveyed by the conveyor;
  a first storage configured to store (i) user-identification information comprising at least first-user-identification information corresponding to a first user and (ii) numeric information indicating a printable number comprising at least a first printable number associated with the first-user-identification information;
  a first communication device configured to perform communication using a first wireless communication method; and
  a first controller,
wherein the first controller is configured to execute:
  a designation accepting processing in which the first controller accepts designation of the first-user-identification information via the first communication device;
  a number allocating processing in which the first controller receives first numeric information from a second printing apparatus different from the first printing apparatus in a state in which communication using the first wireless communication method is established between the first communication device of the first printing apparatus and a second communication device of the second printing apparatus by bringing one of the first printing apparatus and the second printing apparatus close to the other of the first printing apparatus and the second printing apparatus, and the first controller updates numeric information indicating the first printable number stored in the first storage based on the received first numeric information, the first numeric information indicating at least a portion of a second printable number stored in a second storage of the second printing apparatus and associated with the first user-identification information, of which designation is accepted in the designation accepting processing; and
  a printing limiting processing in which the first controller controls the conveyor and the printing device to perform printing on the printing medium based on print data so as to limit the number of printed materials to be produced, to the first printable number.

22. The printing apparatus according to claim 21, wherein the first controller is configured to, in the number allocating processing, obtain, from the second printing apparatus, numeric information indicating a number related to a time elapsed from establishment of the communication using the first wireless communication method, among the second printable number associated with the first user-identification information.

23. The printing apparatus according to claim 21, wherein the first controller is configured to, in the number allocating processing, receive, from the second printing apparatus, numeric information indicating all of the second printable number for the second printing apparatus which is associated with the first user-identification information.

24. The printing apparatus according to claim 21,
wherein the first controller is configured to execute a numeric-information transmitting processing in which the first controller transmits the first printable number stored in the first storage and associated with the first user-identification information, to the second printing apparatus, and
wherein the first controller is configured to, in the number allocating processing, update the numeric information indicating the first printable number by adding the received first numeric information to the numeric information stored in the first storage and indicating the first printable number.

* * * * *